United States Patent
Naito

(10) Patent No.: US 11,973,387 B2
(45) Date of Patent: Apr. 30, 2024

(54) ELECTRIC WORK MACHINE

(71) Applicant: MAKITA CORPORATION, Anjo (JP)

(72) Inventor: Akira Naito, Anjo (JP)

(73) Assignee: MAKITA CORPORATION, Anjo (JP)

( * ) Notice: Subject to any disclaimer, the term of this patent is extended or adjusted under 35 U.S.C. 154(b) by 396 days.

(21) Appl. No.: 17/596,745

(22) PCT Filed: Jun. 19, 2020

(86) PCT No.: PCT/JP2020/024240
§ 371 (c)(1),
(2) Date: Dec. 17, 2021

(87) PCT Pub. No.: WO2021/033410
PCT Pub. Date: Feb. 25, 2021

(65) Prior Publication Data
US 2022/0320939 A1  Oct. 6, 2022

(30) Foreign Application Priority Data
Aug. 21, 2019 (JP) ................. 2019-151366

(51) Int. Cl.
*H02K 3/34* (2006.01)
*B25F 5/00* (2006.01)
(Continued)

(52) U.S. Cl.
CPC ............. *H02K 3/34* (2013.01); *B25F 5/001* (2013.01); *H02K 3/12* (2013.01); *H02K 7/003* (2013.01); *H02K 7/116* (2013.01); *H02K 7/145* (2013.01)

(58) Field of Classification Search
CPC . B25F 5/001; H02K 3/12; H02K 3/34; H02K 7/003; H02K 7/116; H02K 7/145
(Continued)

(56) References Cited

U.S. PATENT DOCUMENTS

2011/0309711 A1  12/2011  Brown
2020/0119600 A1   4/2020  Inuzuka
(Continued)

FOREIGN PATENT DOCUMENTS

JP  2015047072 A  3/2015
JP  2015133808 A  7/2015
(Continued)

OTHER PUBLICATIONS

English translation the International Search Report dated Aug. 18, 2020 in parent application No. PCT/JP2020/024240.
(Continued)

*Primary Examiner* — Rashad H Johnson
(74) *Attorney, Agent, or Firm* — J-TEK LAW PLLC; Jeffrey D. Tekanic; Scott T. Wakeman

(57) ABSTRACT

An electric work machine (1) includes a motor (8) having a rotor (23) disposed within a stator core (31) and coils (34) disposed on the stator core; a power-transmission mechanism (10) driven by the rotor; and an output shaft (6), on which a tool accessory is mountable and which is operably driven by the power-transmission mechanism. The stator core includes an outer-side member (40) having projection parts (42) protruding radially inward from a circular-ring part (41) in a spaced apart manner in a circumferential direction of the stator core and respectively supporting the coils; and an inner-side member (43) disposed radially inward of the outer-side member and coupled to inner-end portions of the projection parts. A plurality of first insulators (32) and a plurality of second insulators (33) may be respectively disposed around the projection parts and interconnected in an alternating manner in the circumferential direction.

20 Claims, 15 Drawing Sheets

(51) Int. Cl.
*H02K 3/12* (2006.01)
*H02K 7/00* (2006.01)
*H02K 7/116* (2006.01)
*H02K 7/14* (2006.01)

(58) Field of Classification Search
USPC .......................................................... 310/208
See application file for complete search history.

(56) References Cited

U.S. PATENT DOCUMENTS

| | | | | |
|---|---|---|---|---|
| 2022/0006347 | A1* | 1/2022 | Fujii | H02K 9/06 |
| 2022/0006362 | A1* | 1/2022 | Fujii | H02K 7/145 |
| 2022/0085698 | A1* | 3/2022 | Niwa | H02P 29/60 |
| 2022/0094251 | A1* | 3/2022 | Niwa | H02P 29/62 |
| 2022/0271595 | A1* | 8/2022 | Kawamoto | H02K 3/50 |
| 2022/0278583 | A1* | 9/2022 | Aoyagi | H02K 3/522 |
| 2023/0066000 | A1* | 3/2023 | Kouda | H02K 11/215 |
| 2023/0119735 | A1* | 4/2023 | Chikaraishi | H02K 1/16 |
| | | | | 310/216.001 |
| 2023/0132168 | A1* | 4/2023 | Hattori | H02K 3/522 |
| | | | | 310/71 |
| 2023/0198342 | A1* | 6/2023 | Ichioka | B25F 5/00 |
| | | | | 310/68 B |
| 2023/0208231 | A1* | 6/2023 | Suzuki | H02K 3/522 |
| | | | | 310/71 |
| 2023/0208243 | A1* | 6/2023 | Hori | H02K 3/522 |
| | | | | 310/216.105 |
| 2023/0216359 | A1* | 7/2023 | Inuzuka | H02K 11/215 |
| | | | | 310/50 |
| 2023/0231457 | A1* | 7/2023 | Kouda | H02K 9/06 |
| | | | | 310/50 |
| 2023/0291265 | A1* | 9/2023 | Hasegawa | H02K 1/148 |
| 2023/0302622 | A1* | 9/2023 | Sasaki | B25F 5/02 |
| 2024/0075609 | * | 3/2024 | Zhao | B25F 5/02 |

FOREIGN PATENT DOCUMENTS

| | | |
|---|---|---|
| JP | 2016072997 A | 5/2016 |
| JP | 2016220400 A | 12/2016 |
| JP | 2017085756 A | 5/2017 |
| JP | 2019004599 A | 1/2019 |

OTHER PUBLICATIONS

Office Action from the Japanese Patent Office dispatched Jun. 6, 2023 in related JP application No. 2019-151366, and machine translation thereof.

* cited by examiner

ELECTRIC WORK MACHINE

CROSS-REFERENCE

This application is the US national stage of International Patent Application No. PCT/JP2020/024240 filed on Jun. 19, 2020, which claims priority to Japanese Patent Application No. 2019-151366 filed on Aug. 21, 2019.

TECHNICAL FIELD

The present disclosure relates to an electric work machine.

BACKGROUND ART

Brushless motors are used as the power source of electric work machines such as electric power tools. In Patent Document 1, a technique is disclosed in which the stator core of a brushless motor is configured as a divided structure. By configuring the stator core as a divided structure, it becomes easy to wind coils on the stator core, and therefore the space factor of the coils increases. By increasing the space factor of the coils, it is possible to achieve compactness and increased output of the motor.

PRIOR ART LITERATURE

Patent Documents

Patent Document 1
Japanese Laid-open Patent Application 2019-004599

SUMMARY OF THE INVENTION

In a divided structure in which the stator core is divided by teeth, multiple divided-structure bodies, each having a tooth, are created. The stator core is created by connecting the multiple divided-structure bodies, each having a tooth. In the situation in which the multiple divided-structure bodies, each having a tooth, are connected, there is a possibility that the relative positions of the teeth will deviate.

An object of the present disclosure is to curtail deviations in the relative positions of teeth while increasing the space factor of coils.

According to the present disclosure, an electric work machine is provided that comprises: a motor comprising a stator and a rotor, which is disposed inward of the stator and is rotatable about a rotational axis; a power-transmission mechanism; and an output shaft, on which a tool accessory is mounted and that drives the tool accessory using power transmitted from the motor via the power-transmission mechanism; wherein: the stator comprises: a stator core; and a plurality of coils; the stator core comprises: an outer-side member comprising a circular-ring part and a plurality of projection parts, the projection parts protruding from the circular-ring part inward in the radial direction, being disposed spaced apart in the circumferential direction, and supporting the coils; and an inner-side member disposed inward of the outer-side member and coupled to inner-end portions of the projection parts.

According to the present disclosure, deviations in the relative positions of teeth can be curtailed while increasing the space factor of coils.

DETAILED DESCRIPTION

Embodiments according to the present disclosure will be explained below, with reference to the drawings, but the present disclosure is not limited thereto. Structural elements of the embodiments explained below can be combined where appropriate. In addition, there are also situations in which some of the structural elements are not used.

In the embodiments, the positional relationships among parts are explained using the terms left, right, front, rear, up, and down. These terms indicate relative position or direction, in which the center of an electric work machine serves as a reference. The electric work machine includes electric power tools having a motor.

In the embodiments, the direction parallel to a rotational axis AX of the motor is called the axial direction where appropriate, the radial direction of the rotational axis AX of the motor is called the radial direction where appropriate, and the direction that goes around the rotational axis AX of the motor is called the circumferential direction where appropriate. In addition, with regard to the radial direction, a direction that is located close to or approaches the rotational axis AX of the motor is called inward in the radial direction where appropriate, and a direction that is located far from or leads away from the rotational axis AX of the motor is called outward in the radial direction where appropriate.

[Electric Power Tool]

Figure 1:
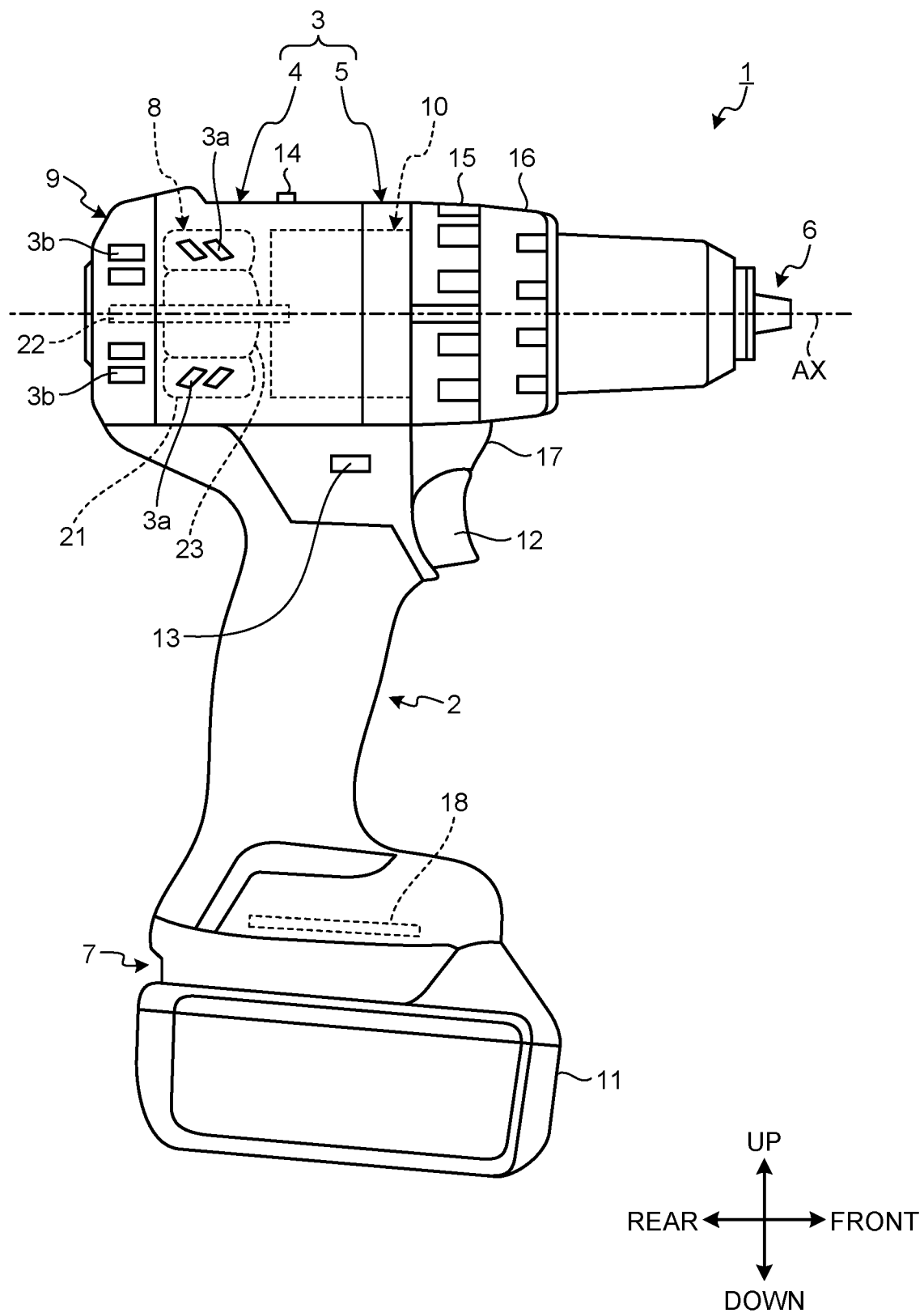
FIG. 1 is a side view that shows an electric power tool according to the present embodiment.

FIG. 1 is a side view that shows an electric power tool 1 according to the present embodiment. In the present embodiment, it is assumed that the electric power tool 1 is a hammer driver-drill. As shown in FIG. 1, the electric power tool 1 comprises: a grip housing 2; a main-body housing 3, which is disposed upward of the grip housing 2 and houses a motor 8 and a power-transmission mechanism 10; an output shaft 6, which protrudes forward from the main-body housing 3; and a battery-mounting part 7, which is disposed on a lower portion of the grip housing 2.

The grip housing 2 is gripped by a user. The grip housing 2 protrudes downward from the lower portion of the main-body housing 3. The grip housing 2 is made of a synthetic resin.

The main-body housing 3 comprises a motor housing 4 and a gear housing 5, which is disposed forward of the motor housing 4. The output shaft 6 protrudes forward from the gear housing 5.

The motor housing 4 houses the motor 8. The motor housing 4 has a tube shape. The motor 8 is disposed in an interior space of the motor housing 4. The motor housing 4 is integral with the grip housing 2. The motor housing 4 is made of a synthetic resin. A rear cover 9 is provided on a rear portion of the motor housing 4. The rear cover 9 covers an opening of the rear portion of the motor housing 4. The rear cover 9 is made of a synthetic resin.

The motor housing 4 has air-intake ports 3a. The rear cover 9 has air-exhaust ports 3b. The air-exhaust ports 3b are provided rearward of the air-intake ports 3a. The air-intake ports 3a connect the interior space and the exterior space of the main-body housing 3. The air-exhaust ports 3b connect the interior space and the exterior space of the main-body housing 3. The air-intake ports 3a are provided on both a left portion and a right portion of the motor housing 4. The air-exhaust ports 3b are provided on both a left portion and a right portion of the rear cover 9. Air in the exterior space of the main-body housing 3 flows into the interior space of the main-body housing 3 via the air-intake ports 3a. The air in the interior space of the main-body housing 3 flows out to the exterior space of the main-body housing 3 via the air-exhaust ports 3b.

The gear housing 5 houses the power-transmission mechanism 10, which comprises a plurality of gears. The gear housing 5 has a tube shape. The power-transmission mechanism 10 is disposed in the interior space of the gear housing 5. The gear housing 5 is made of aluminum.

A tool accessory is mountable on the output shaft 6. The tool accessory, such as a drill, is installed on the output shaft 6. The output shaft 6 comprises: a spindle, which rotates owing to the power generated by the motor 8; and a chuck, which is capable of holding the tool accessory.

The battery-mounting part 7 is connected to a battery pack 11. The battery-mounting part 7 is provided on a lower portion of the grip housing 2. The battery pack 11 is mountable on the battery-mounting part 7 in a detachable manner. The battery pack 11 contains a secondary battery or secondary batteries. In the present embodiment, the battery pack 11 comprises a rechargeable-type lithium-ion battery. By being mounted on the battery-mounting part 7, the battery pack 11 can supply electric power to the electric power tool 1.

The motor 8 generates power for driving the output shaft 6. The motor 8 operates using the electric power supplied from the battery pack 11. The power-transmission mechanism 10 transmits, to the output shaft 6, the power generated by the motor 8. The output shaft 6 will be driven using the power transmitted from the motor 8 via the power-transmission mechanism 10.

The electric power tool 1 comprises a trigger switch 12, a forward/reverse-changing lever 13, a speed-changing lever 14, a mode-change ring 15, a change ring 16, a light 17, and a controller 18.

The trigger switch 12 is provided on the grip housing 2. The trigger switch 12 protrudes forward from an upper portion of a front portion of the grip housing 2. The trigger switch 12 is manipulated by the user. The user can manipulate the trigger switch 12 with a finger in the state in which the user has grasped the grip housing 2 with either the left or right hand. By manipulating the trigger switch 12, electric power is supplied from the battery pack 11 to the motor 8, and thereby the motor 8 will be driven. By manipulating the trigger switch 12, the motor 8 switches between being driven and being stopped.

The forward/reverse-changing lever 13 is provided on an upper portion of a side portion of the grip housing 2. The forward/reverse-changing lever 13 is manipulated by the user. By manipulating the forward/reverse-changing lever 13, the rotational direction of the motor 8 changes. The user can manipulate the forward/reverse-changing lever 13 to change the rotational direction of the motor 8 from one of the forward-rotational direction and the reverse-rotational direction to the other. By changing the rotational direction of the motor 8, the rotational direction of the output shaft 6 changes.

The speed-changing lever 14 is provided on an upper portion of the main-body housing 3. The speed-changing lever 14 is manipulated by the user. By manipulating the speed-changing lever 14, the rotational speed of the output shaft 6 changes. The user can operate the speed-changing lever 14 to change the rotational speed of the output shaft 6 from one of a first speed and a second speed, which is higher than the first speed, to the other.

The mode-change ring 15 is disposed forward of the gear housing 5. The mode-change ring 15 is manipulated by the user. By manipulating the mode-change ring 15, the action mode of the electric power tool 1 changes.

The action modes of the electric power tool 1 include: a hammer mode, in which the output shaft 6 hammers in a front-rear direction; and a non-hammer mode, in which the output shaft 6 does not hammer in the front-rear direction. The non-hammer mode includes a drill mode, in which power is transmitted to the output shaft 6 regardless of the rotational load that acts on the output shaft 6; and a clutch mode, in which the power transmitted to the output shaft 6 is cut off based on the rotational load that is acting on the output shaft 6.

The change ring 16 is disposed forward of the mode-change ring 15. The change ring 16 is manipulated by the user. In the clutch mode, by manipulating the change ring 16, the release value, at which power transmitted to the output shaft 6 is cut off, is set. The release value is a value relating to the rotational load that is acting on the output shaft 6. When the rotational load that is acting on the output shaft 6 has reached the release value, the power transmitted to the output shaft 6 is cut off.

The light 17 is provided at an upper portion of a front portion of the grip housing 2. The light 17 emits illumination light, which illuminates forward of the electric power tool 1. The light 17 includes, for example, a light-emitting diode (LED: light-emitting diode).

The controller 18 outputs control signals, which control the electric power tool 1. The controller 18 is housed in the grip housing 2. The controller 18 is disposed in a lower portion of the interior space of the grip housing 2.

[Motor]

The motor 8 is a brushless motor. The motor 8 is an inner-rotor-type motor comprising a stator 21, which has a tube shape, and a rotor 23, which is disposed inward of the stator 21. The rotor 23 comprises a rotary shaft 22, which extends in the axial direction. The rotor 23 is rotatable about the rotational axis AX.

[Stator]

Figure 2:
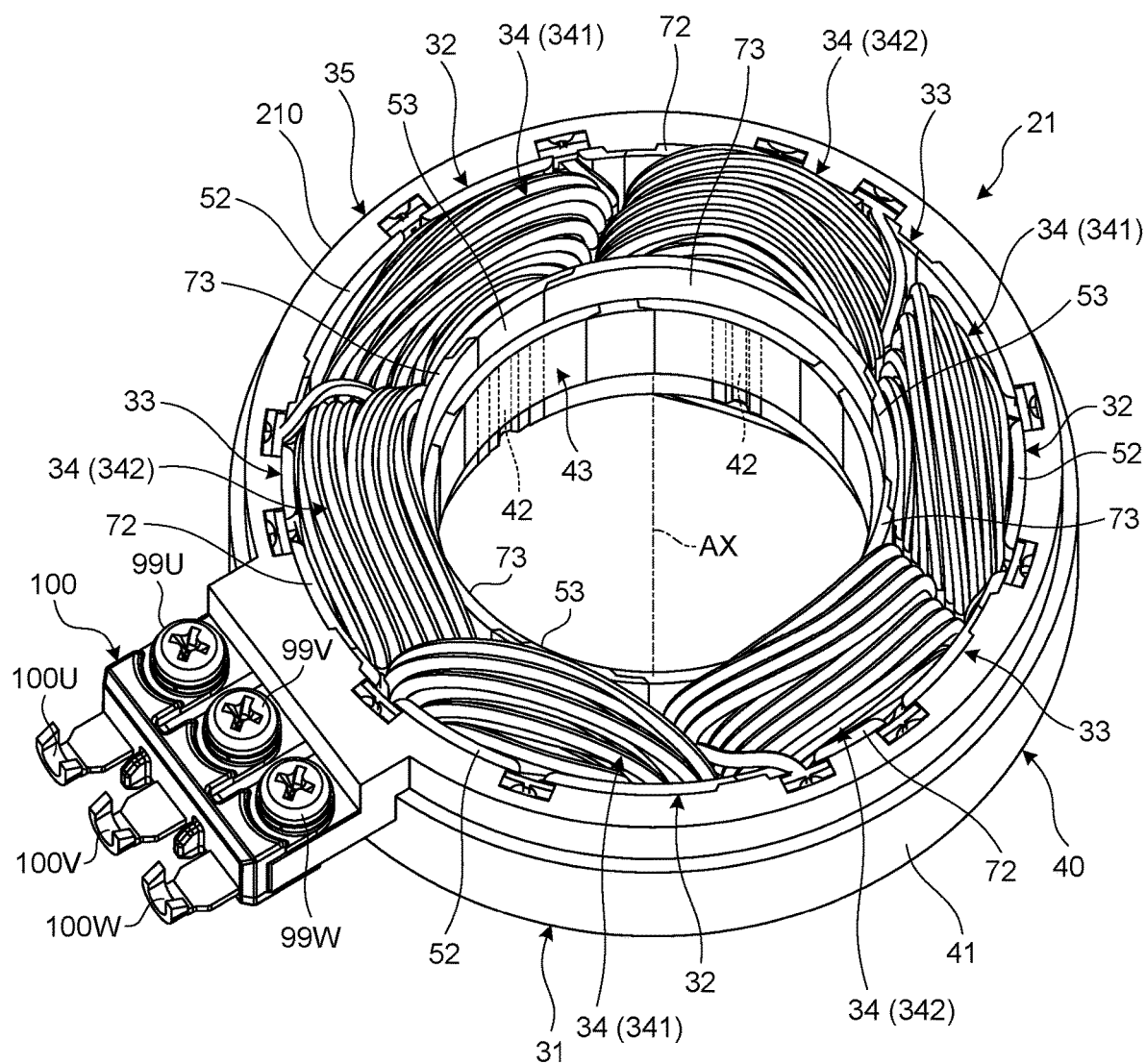
FIG. 2 is an oblique view that shows a stator according to the present embodiment.

FIG. 2 is an oblique view that shows the stator 21 according to the present embodiment. As shown in FIG. 1 and FIG. 2, the stator 21 comprises a stator core 31, first insulators 32, second insulators 33, coils 34, and a short-circuiting member 35. In the present embodiment, the stator 21 has six of the coils 34.

The stator core 31 is made of a metal whose main component is iron. The stator core 31 comprises an outer-side member 40 and an inner-side member 43, which is disposed inward of the outer-side member 40. The outer-side member 40 comprises a circular-ring part 41 and a plurality of projection parts 42. The circular-ring part 41 has a circular-cylinder shape. Each projection part 42 of the plurality of projection parts 42 protrudes inward in the radial direction from the inner surface of the circular-ring part 41. The plurality of projection parts 42 is disposed such that the projection parts 42 are spaced apart in the circumferential direction. In the present embodiment, six of the projection parts 42 are provided. The projection parts 42 respectively support the coils 34. The circular-ring part 41 is integral with the projection parts 42. That is, the circular-ring part 41 and the projection parts 42 are a single member. The inner-side member 43 has a circular-cylinder shape. The inner-side member 43 is disposed inward of the outer-side member 40 in the radial direction. The inner-side member 43 is coupled to an inner-end portion of each of the projection parts 42.

Each of the first insulators 32 and the second insulators 33 is an electrically insulating member made of a synthetic resin. In the present embodiment, three of the first insulators 32 are provided. Three of the second insulators 33 are provided. Each of the first insulators 32 and the second insulators 33 is disposed around a projection part 42. The first insulators 32 and the second insulators 33 are disposed alternately in the circumferential direction. Each of the first insulators 32 and each of the second insulators 33 are separable from the outer-side member 40.

A coil 34 is wound on each of the first insulators 32 and the second insulators 33. In the present embodiment, six of the coils 34 are provided. Three of the projection parts 42 among the six projection parts 42 support coils 34 via the first insulators 32. Three of the projection parts 42 among the six projection parts 42 support coils 34 via the second insulators 33. In the explanation below, the coils 34 supported by the first insulators 32 are called first coils 341 where appropriate, and the coils 34 supported by the second insulators 33 are called second coils 342 where appropriate.

Figure 3:
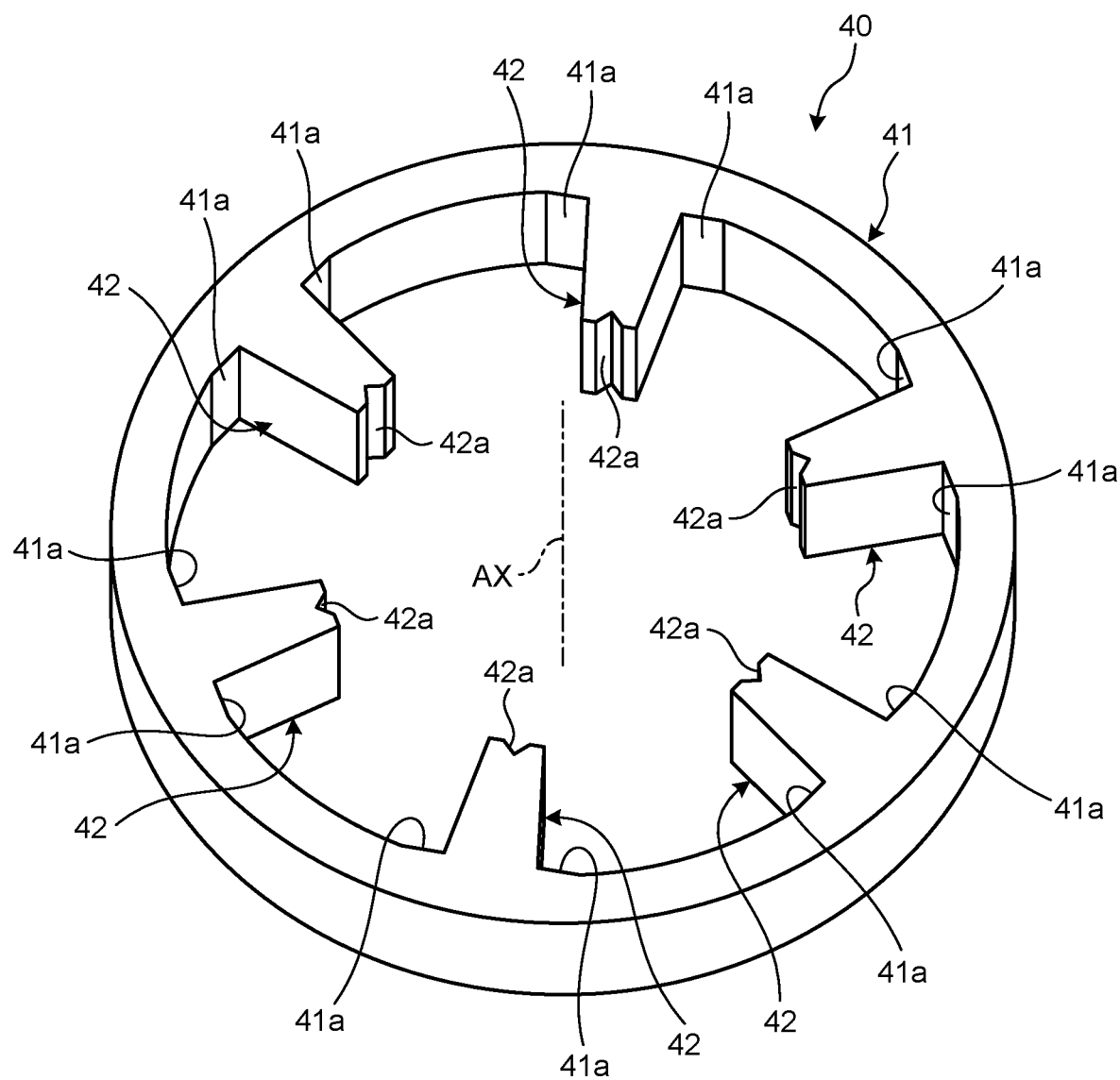
FIG. 3 is an oblique view that shows an outer-side member according to the present embodiment.

FIG. 3 is an oblique view that shows the outer-side member 40 according to the present embodiment. The outer-side member 40 comprises the circular-ring part 41 and the projection parts 42. The circular-ring part 41 is disposed around the rotational axis AX. The circular-ring part 41 has a circular-cylinder shape.

The projection parts 42 protrude inward in the radial direction from the inner surface of the circular-ring part 41. The projection parts 42 are disposed equispaced in the circumferential direction. Six of the projection parts 42 are provided. The projection parts 42 are disposed spaced apart by 60 [°] in the circumferential direction.

The projection parts 42 are integral with the circular-ring part 41. The outer-side member 40 comprises a plurality of steel sheets stacked in the axial direction. The steel sheets are sheets made of a metal whose main component is iron. The outer-side member 40 is formed by stacking the plurality of steel sheets.

The width of each of the projection parts 42 gradually becomes small as it goes inward in the radial direction from the inner surface of the circular-ring part 41. The width of each of the projection parts 42 refers to the dimension of the projection part 42 in the circumferential direction. Tilted parts 41a are provided on the inner surface of the circular-ring part 41. The tilted parts 41a are adjacent to side surfaces of the projection parts 42. The tilted parts 41a are tilted inward in the radial direction as they go toward the side surfaces of the projection parts 42. The tilted parts 41a are provided on the inner surface of the circular-ring part 41 on both sides of each of the projection parts 42 in the circumferential direction. The distance between the projection parts 42 adjacent in the circumferential direction becomes short as they go inward in the radial direction. The projection parts 42 have engaging-groove parts 42a. The engaging-groove parts 42a are provided in inner-end portions of the projection parts 42. The engaging-groove parts 42a extend in the axial direction. Openings are provided at both end portions of the engaging-groove parts 42a in the axial direction. The openings of the engaging-groove parts 42a are provided at end surfaces of the projection parts 42 in the axial direction. That is, both end portions of the engaging-groove parts 42a in the axial direction are open.

The dimension of the outer-side member 40 in the axial direction is constant. The end surfaces of the outer-side member 40 in the axial direction are orthogonal to the rotational axis AX. The end surfaces of the circular-ring part 41 in the axial direction and the end surfaces of the projection parts 42 in the axial direction are disposed within the same planes.

Figure 4:
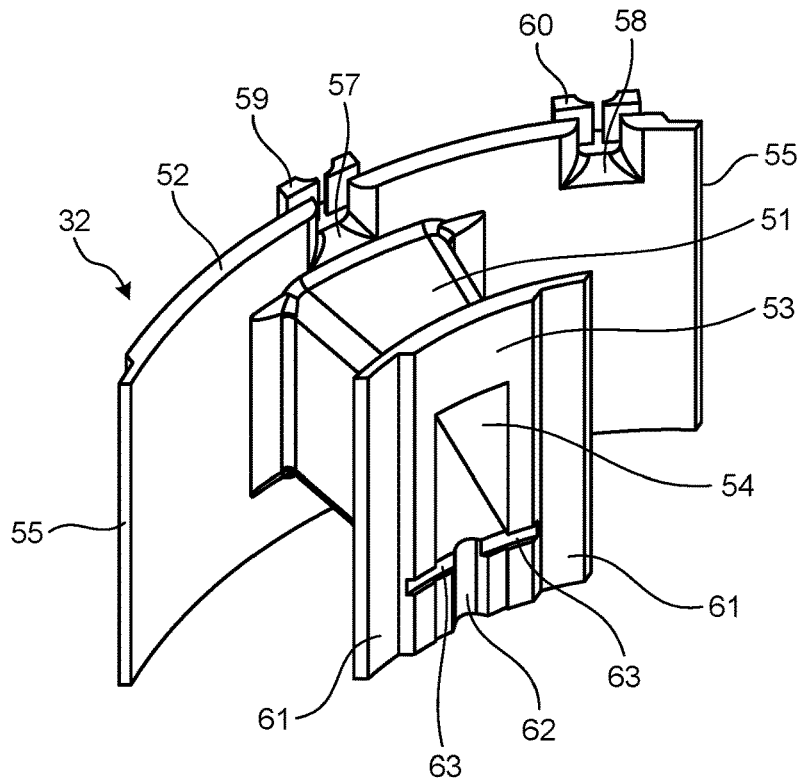
FIG. 4 is an oblique view in which a first insulator according to the present embodiment is viewed from inward in the radial direction.
Figure 5:
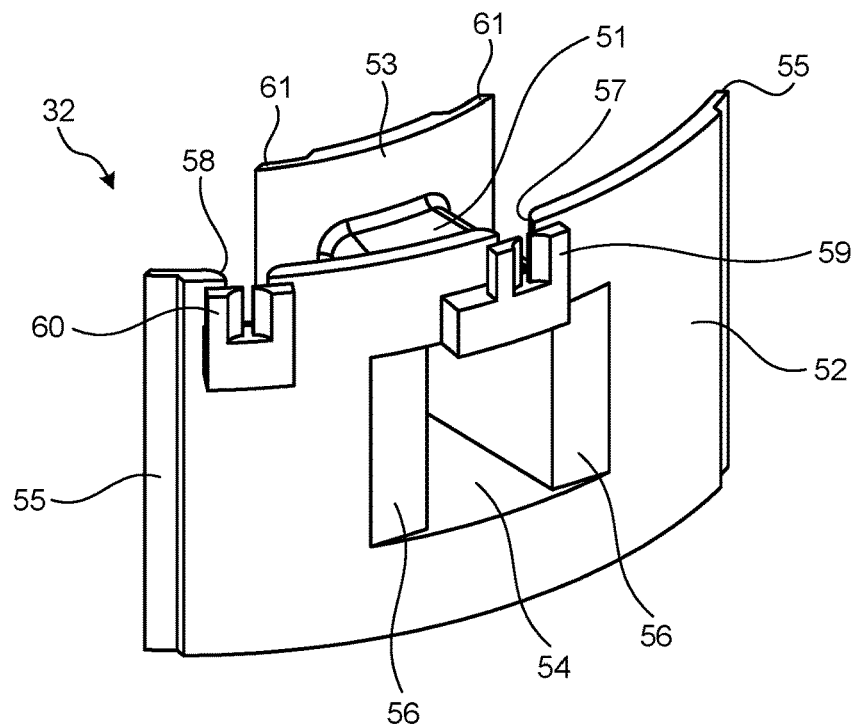
FIG. 5 is an oblique view in which the first insulator according to the present embodiment is viewed from outward in the radial direction.
Figure 6:
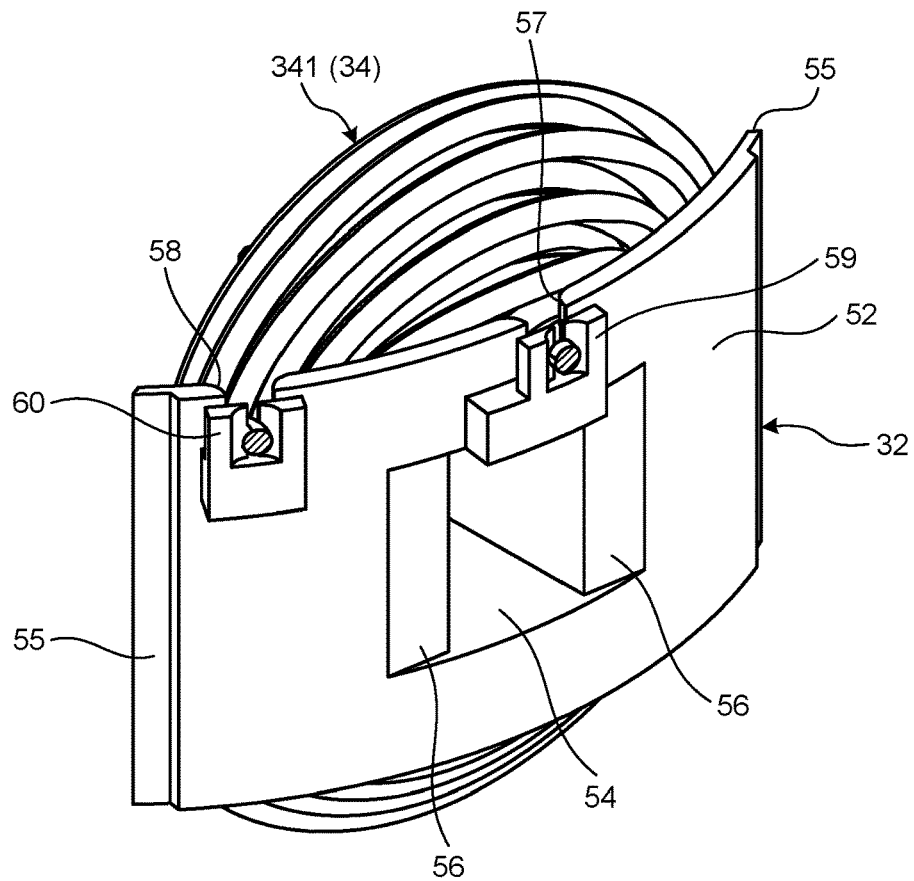
FIG. 6 is an oblique view that shows the first insulator, on which a first coil has been wound, according to the present embodiment.

FIG. 4 is an oblique view, viewed from inward in the radial direction, of a first insulator 32 according to the present embodiment. FIG. 5 is an oblique view, viewed from outward in the radial direction, of a first insulator 32 according to the present embodiment. FIG. 6 is an oblique view that shows a first insulator 32, on which a first coil 341 has been wound, according to the present embodiment.

The first insulators 32 are disposed around the projection parts 42. Each of the first insulators 32 comprises a tube part 51, an outer-wall part 52, and an inner-wall part 53. The outer-wall part 52 is provided at an end portion of the tube part 51 that is outward in the radial direction. The inner-wall part 53 is provided at an end portion of the tube part 51 that is inward in the radial direction. The tube part 51, the outer-wall part 52, and the inner-wall part 53 are integral (a single member).

The tube part 51 has a tube shape. The cross section of the tube part 51 has a quadrangular shape. The tube part 51 has a through hole 54, into which the projection part 42 is inserted. The tube part 51 is disposed around the projection part 42. The through hole 54 extends in the radial direction. In the state in which the projection part 42 has been inserted into the through hole 54, the tube part 51 is disposed around the projection part 42.

The end portion of the first insulator 32 that is outward in the radial direction is coupled to the circular-ring part 41 of the outer-side member 40. The end portion of the first insulator 32 that is inward in the radial direction is coupled to the inner-side member 43. In the present embodiment, the outer-wall part 52 is coupled to the circular-ring part 41 of the outer-side member 40, and the inner-wall part 53 is coupled to the inner-side member 43. The end portion of the tube part 51 that is outward in the radial direction is coupled to the circular-ring part 41 of the outer-side member 40 via the outer-wall part 52. The end portion of the tube part 51 that is inward in the radial direction is coupled to the inner-side member 43 via the inner-wall part 53.

With regard to the first insulator 32, the dimension of the outer-wall part 52 in the circumferential direction is larger than the dimension of the inner-wall part 53 in the circumferential direction. The outer-wall part 52 comprises thin-walled parts 55, which are provided on both end portions of the outer-wall part 52 in the circumferential direction. The dimension of each of the thin-walled parts 55 of the outer-wall part 52 in the radial direction is smaller than the dimension of the outer-wall part 52 in the radial direction that is the portion other than the thin-walled parts 55. The thin-walled parts 55 extend in the axial direction. In addition, the outer-wall part 52 comprises tilted parts 56, which are provided on an outer surface of the outer-wall part 52. Each of the tilted parts 56 is tilted inward in the radial direction as it goes toward the inner surface of the tube part 51 (the inner surface of the through hole 54). The tilted parts 56 are provided on the outer surface of the outer-wall part 52 on both sides of the through hole 54 in the circumferential direction. In addition, the outer-wall part 52 has a notched part 57 and a notched part 58, which are provided on an upper-end portion of the outer-wall part 52. One end portion of the first coil 341 is disposed in the notched part 57, and the other end portion of the first coil 341 is disposed in the notched part 58. In addition, the outer-wall part 52 comprises a latching part 59, which is disposed outward of the notched part 57 in the radial direction, and a latching part 60, which is disposed outward of the notched part 58 in the radial direction. The latching part 59 holds one end portion of the first coil 341. The latching part 60 holds the other end portion of the first coil 341. The end portions of the first coil 341 are latched to the latching part 59 and the latching part 60.

The inner-wall part 53 has thin-walled parts 61, which are provided at both end portions of the inner-wall part 53 in the circumferential direction. The dimension of the thin-walled parts 61 of the inner-wall part 53 in the radial direction is smaller than the dimension of the inner-wall part 53 in the radial direction that is the portion other than the thin-walled parts 61. The thin-walled parts 61 extend in the axial direction. In addition, the inner-wall part 53 has a communicating-groove part 62, which is provided in the inner surface of the inner-wall part 53. The communicating-groove part 62 is formed on the other side of the through hole 54 in the axial direction. The communicating-groove part 62 extends in the axial direction. Openings are provided in the communicating-groove part 62 at both end portions in the axial direction. The openings of the communicating-groove part 62 are provided in the inner surface of the through hole 54 in the axial direction and the end surface of the inner-wall part 53 in the axial direction. That is, both end portions of the communicating-groove part 62 in the axial direction are open. In the state in which the projection part 42 is inserted into the through hole 54 of the first insulator 32, the communicating-groove part 62 and the engaging-groove part 42a are linked. The communicating-groove part 62 and the engaging-groove part 42a are not provided with a difference in level.

The inner-wall part 53 has latching-groove parts 63, which are provided on an inner surface of the inner-wall part 53. The latching-groove parts 63 are formed on the other side of the through hole 54 in the axial direction. The latching-groove parts 63 extend in the circumferential direction such that they intersect the communicating-groove part 62. The latching-groove parts 63 are provided on both sides of the communicating-groove part 62 in the circumferential direction. The depth of the latching-groove parts 63 (the dimension in the radial direction) is shallower than the depth of the communicating-groove part 62.

The first coil 341 is disposed around the tube part 51. The projection part 42 supports the first coil 341 via the first insulator 32. Within a plane that is orthogonal to the rotational axis AX, the outer shape of the first coil 341 disposed around the tube part 51 is a trapezoidal shape. The dimension of the outer shape of the first coil 341 in the circumferential direction gradually becomes large as it goes inward in the radial direction. In addition, the dimension of the outer shape of the first coil 341 in the axial direction gradually becomes large as it goes inward in the radial direction. One end portion of the first coil 341 passes through the notched part 57 of the outer-wall part 52 and is latched to the latching part 59. The other end portion of the first coil 341 passes through the notched part 58 of the outer-wall part 52 and is latched to the latching part 60.

In the situation in which the first coil 341 is wound on the tube part 51 using a nozzle method, one end portion of a wire that is fed out of the nozzle is latched to the latching part 59. In the state in which one end portion of the wire is latched to the latching part 59, the nozzle orbits the tube part 51 while feeding out the wire. By virtue of the nozzle orbiting the tube part 51 in the state in which the wire is being fed out from the nozzle, the first coil 341 is provided around the tube part 51. After the first coil 341 has been provided around the tube part 51, the other end portion of the wire is latched to the latching part 60.

The end portion of the first coil 341 that is latched to the latching part 59 is the end portion from which the winding of the first coil 341 is begun. The end portion of the first coil 341 that is latched to the latching part 60 is the end portion at which the winding of the first coil 341 ends.

Figure 7:
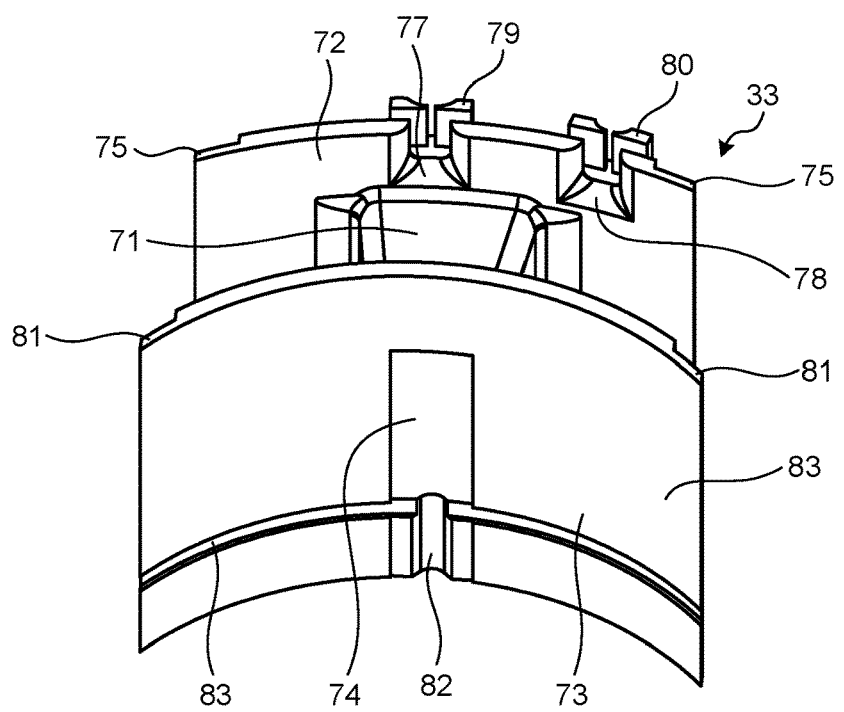
FIG. 7 is an oblique view in which a second insulator according to the present embodiment is viewed from inward in the radial direction.
Figure 8:
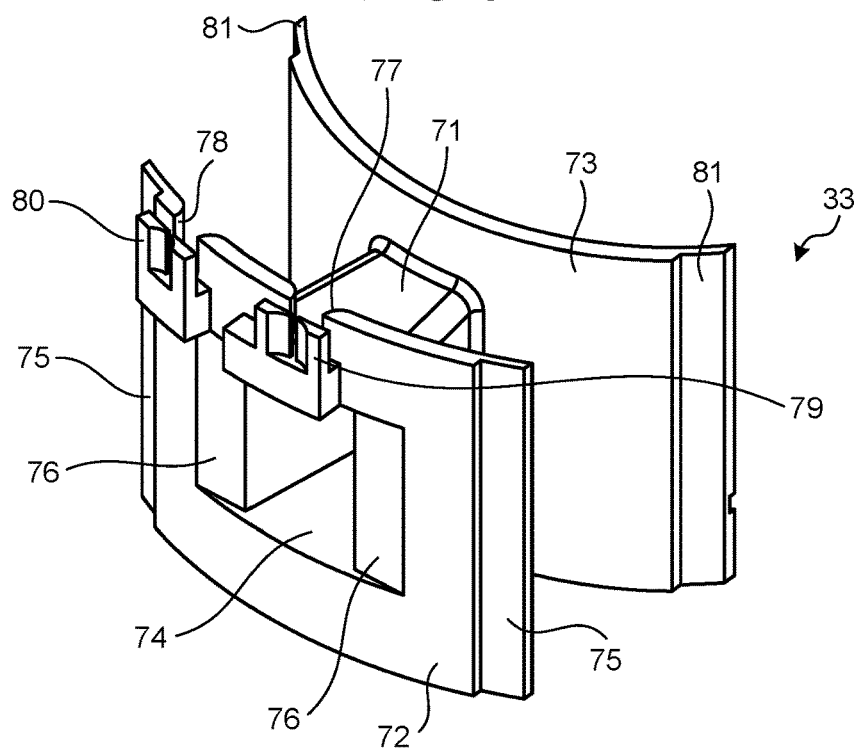
FIG. 8 is an oblique view in which the second insulator according to the present embodiment is viewed from outward in the radial direction.
Figure 9:
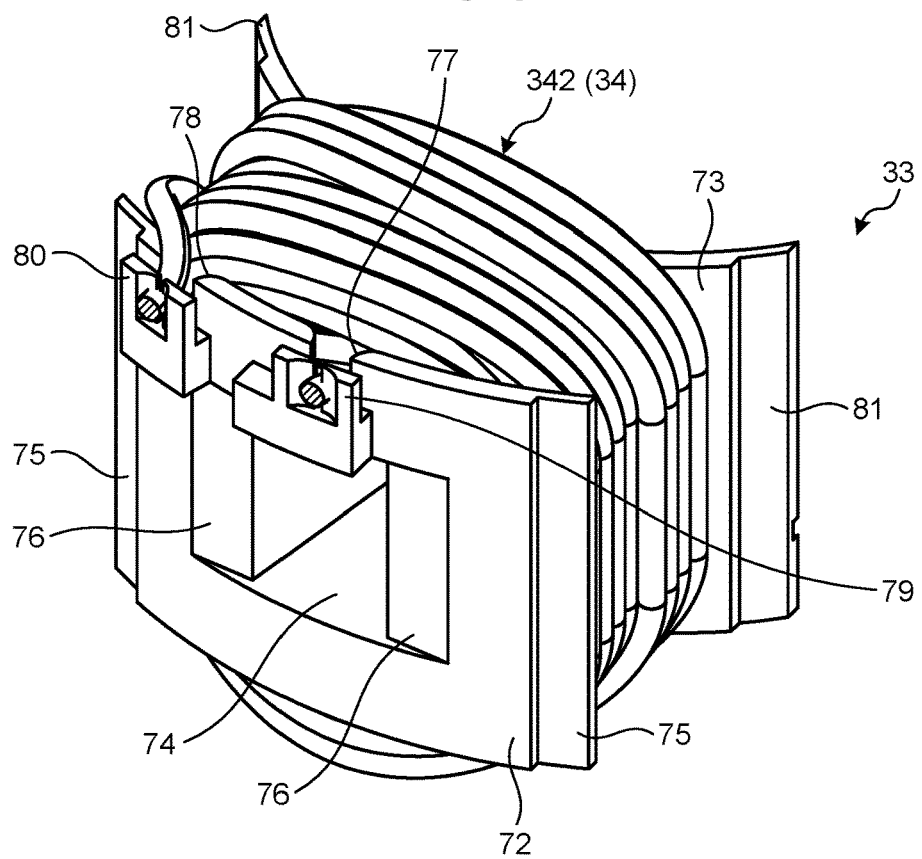
FIG. 9 is an oblique view that shows the second insulator, on which a second coil has been wound, according to the present embodiment.

FIG. 7 is an oblique view, viewed from inward in the radial direction, of the second insulator 33 according to the present embodiment. FIG. 8 is an oblique view, viewed from outward in the radial direction, of the second insulator 33 according to the present embodiment. FIG. 9 is an oblique view that shows the second insulator 33, on which the second coil 342 has been wound, according to the present embodiment.

The second insulators 33 are disposed around the projection parts 42. Each of the second insulators 33 comprises a tube part 71, an outer-wall part 72, and an inner-wall part 73.

The outer-wall part 72 is provided on an end portion of the tube part 71 that is outward in the radial direction. The inner-wall part 73 is provided on an end portion of the tube part 71 that is inward in the radial direction. The tube part 71, the outer-wall part 72, and the inner-wall part 73 are integral (a single member).

The tube part 71 has a tube shape. The cross section of the tube part 71 has a quadrangular shape. The tube part 71 has a through hole 74, into which the projection part 42 is inserted. The tube part 71 is disposed around the projection part 42. The through hole 74 extends in the radial direction. In the state in which the projection part 42 has been inserted into the through hole 74, the tube part 71 is disposed around the projection part 42.

The end portion of the second insulator 33 that is outward in the radial direction is coupled to the circular-ring part 41 of the outer-side member 40. The end portion of the second insulator 33 that is inward in the radial direction is coupled to the inner-side member 43. In the present embodiment, the outer-wall part 72 is coupled to the circular-ring part 41 of the outer-side member 40, and the inner-wall part 73 is coupled to the inner-side member 43. The end portion of the tube part 71 that is outward in the radial direction is coupled to the circular-ring part 41 of the outer-side member 40 via the outer-wall part 72. The end portion of the tube part 71 that is inward in the radial direction is coupled to the inner-side member 43 via the inner-wall part 73.

With regard to the second insulator 33, the dimension of the outer-wall part 72 in the circumferential direction is smaller than the dimension of the inner-wall part 73 in the circumferential direction. The outer-wall part 72 comprises thin-walled parts 75, which are provided on both end portions of the outer-wall part 72 in the circumferential direction. The dimension of each of the thin-walled parts 75 of the outer-wall part 72 in the radial direction is smaller than the dimension of the outer-wall part 72 in the radial direction that is the portion other than the thin-walled parts 75. The thin-walled parts 75 extend in the axial direction. In addition, the outer-wall part 72 comprises tilted parts 76, which are provided on an outer surface of the outer-wall part 72. Each of the tilted parts 76 is tilted inward in the radial direction as it goes toward the inner surface of the tube part 71 (the inner surface of the through hole 74). The tilted parts 76 are provided on the outer surface of the outer-wall part 72 on both sides of the through hole 74 in the circumferential direction. In addition, the outer-wall part 72 has a notched part 77 and a notched part 78, which are provided on an upper-end portion of the outer-wall part 72. One end portion of the second coil 342 is disposed in the notched part 77, and the other end portion of the second coil 342 is disposed in the notched part 78. In addition, the outer-wall part 72 comprises a latching part 79, which is disposed outward of the notched part 77 in the radial direction, and a latching part 80, which is disposed outward of the notched part 78 in the radial direction. The latching part 79 holds one end portion of the second coil 342. The latching part 80 holds the other end portion of the second coil 342. The end portions of the second coil 342 are latched to the latching part 79 and the latching part 80.

The inner-wall part 73 has thin-walled parts 81, which are provided at both end portions of the inner-wall part 73 in the circumferential direction. The dimension of the thin-walled parts 81 of the inner-wall part 73 in the radial direction is smaller than the dimension of the inner-wall part 73 in the radial direction that is the portion other than the thin-walled parts 81. The thin-walled parts 81 extend in the axial direction. In addition, the inner-wall part 73 has a communicating-groove part 82, which is provided in the inner surface of the inner-wall part 73. The communicating-groove part 82 is formed on the other side of the through hole 74 in the axial direction. The communicating-groove part 82 extends in the axial direction. Openings are provided in the communicating-groove part 82 at both end portions in the axial direction. The openings of the communicating-groove part 82 are provided in the inner surface of the through hole 74 in the axial direction and the end surface of the inner-wall part 73 in the axial direction. That is, both end portions of the communicating-groove part 82 in the axial direction are open. In the state in which the projection part 42 is inserted into the through hole 74 of the second insulator 33, the communicating-groove part 82 and the engaging-groove part 42a are linked. The communicating-groove part 82 and the engaging-groove part 42a are not provided with a difference in level.

The inner-wall part 73 has latching-groove parts 83, which are provided in an inner surface of the inner-wall part 73. The latching-groove parts 83 are formed on the other side of the through hole 74 in the axial direction. The latching-groove parts 83 extend in the circumferential direction such that they intersect the communicating-groove part 82. The latching-groove parts 83 are provided on both sides of the communicating-groove part 82 in the circumferential direction. The depth of the latching-groove parts 83 (the dimension in the radial direction) is shallower than the depth of the communicating-groove part 82.

The second coil 342 is disposed around the tube part 71. The projection part 42 supports the second coil 342 via the second insulator 33. Within a plane that is orthogonal to the rotational axis AX, the outer shape of the second coil 342 disposed around the tube part 71 is a rectangular shape. The dimension of the outer shape of the second coil 342 in the circumferential direction is substantially constant in the radial direction. In addition, the dimension of the outer shape of the second coil 342 in the axial direction is substantially constant in the radial direction. One end portion of the second coil 342 passes through the notched part 77 of the outer-wall part 72 and is latched to the latching part 79. The other end portion of the second coil 342 passes through the notched part 78 of the outer-wall part 72 and is latched to the latching part 80.

In the situation in which the second coil 342 is wound on the tube part 71 using a nozzle method, one end portion of a wire that is fed out of the nozzle is latched to the latching part 79. In the state in which one end portion of the wire is latched to the latching part 79, the nozzle orbits the tube part 71 while feeding out the wire. By virtue of the nozzle orbiting the tube part 71 in the state in which the wire is being fed out from the nozzle, the second coil 342 is provided around the tube part 71. After the second coil 342 has been provided around the tube part 71, the other end portion of the wire is latched to the latching part 80.

The end portion of the second coil 342 that is latched to the latching part 79 is the end portion from which the winding of the second coil 342 is begun. The end portion of the second coil 342 that is latched to the latching part 80 is the end portion at which the winding of the second coil 342 ends.

As shown in FIG. 6 and FIG. 9, the coil 34 is wound in the state in which the first insulator 32 and the second insulator 33 are not mounted on the outer-side member 40. In the situation in which the first coil 341 is wound on the tube part 51 using the nozzle method, the first insulator 32 is held by a dedicated jig, and the nozzle, which is capable of feeding out the wire, orbits the tube part 51 while feeding out the wire. By virtue of the nozzle orbiting the tube part 51 in the state in which the wire is being fed out from the nozzle, the first coil 341 is provided around the tube part 51 of the first insulator 32. The same applies also in the situation in which the second coil 342 is wound on the tube part 71 of the second insulator 33 using the nozzle method.

It is noted that the winding method is not limited to the nozzle method. The flyer method is an illustrative example of a method of winding the coil 34 that differs from the nozzle method.

In the present embodiment, because the first coil 341 can be wound on the first insulator 32 before the first insulator 32 is mounted on the outer-side member 40, the nozzle and the user can freely approach the first coil 341. Consequently, the outer shape of the first coil 341 can be shaped easily. Because the first coil 341 can be shaped easily, the outer shape of the first coil 341 can be optimized so as to increase the space factor. In addition, a coating agent can be easily applied to the first coil 341 together with the shaping of the first coil 341. A protective agent that increases at least one of durability, dustproof characteristics, and waterproofness of the first coil 341 is an illustrative example of a coating agent. In addition, by applying the coating agent to the first coil 341, deformation of the first coil 341 is curtailed. The same applies also for the second coil 342, which is wound on the second insulator 33.

Figure 10:
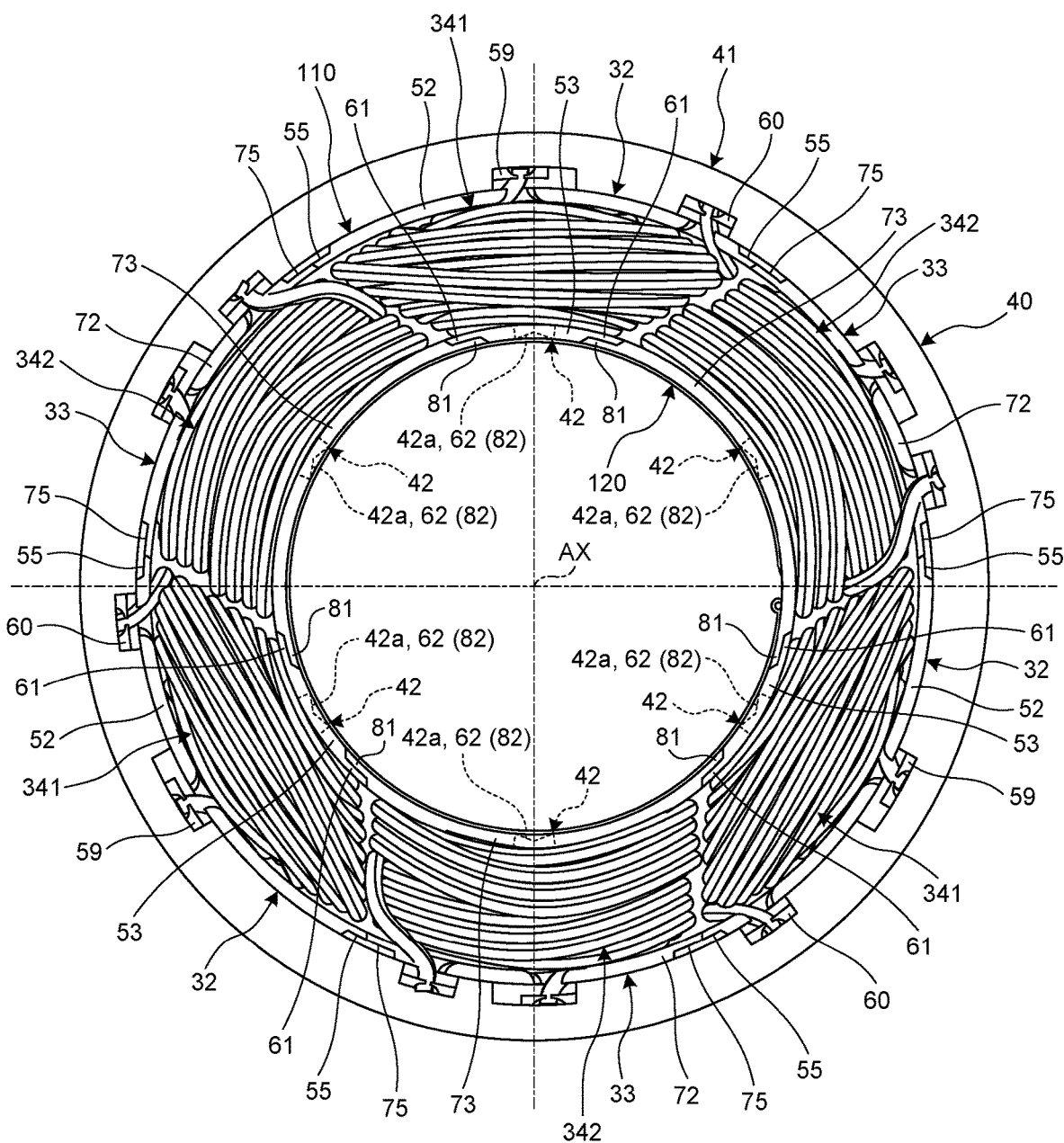
FIG. 10 is a plan view that shows the outer-side member, on which the first insulators, whereon the first coils have been wound, and the second insulators, whereon the second coils have been wound, are mounted according to the present embodiment.

FIG. 10 is a plan view that shows the outer-side member 40 on which the first insulators 32, whereon the first coils 341 are wound, and the second insulators 33, whereon the second coils 342 are wound, are mounted according to the present embodiment.

As shown in FIG. 10, the plurality of first insulators 32 and the plurality of second insulators 33 are provided on the outer-side member 40 of the stator core 31. The plurality of first insulators 32 and the plurality of second insulators 33 are disposed in the circumferential direction on the outer-side member 40 of the stator core 31.

In the present embodiment, the three first insulators 32 are mounted on the projection parts 42 in the state in which the first coils 341 have been wound on the tube parts 51. The first insulators 32 are mounted on the projection parts 42 by inserting the projection parts 42 into the through holes 54 of the tube parts 51. In addition, the three second insulators 33 are mounted on the projection parts 42 in the state in which the second coils 342 have been wound on the tube parts 71. The second insulators 33 are mounted on the projection parts 42 by inserting the projection parts 42 into the through holes 74 of the tube parts 71. The first coils 341 and the outer-side member 40 are electrically insulated from one another by the first insulators 32. The second coils 342 and the outer-side member 40 are electrically insulated from one another by the second insulators 33.

With regard to the outer-side member 40, the first insulators 32 and the second insulators 33 are mounted on the projection parts 42, respectively, such that the first insulators 32 and the second insulators 33 are disposed in an alternating manner in the circumferential direction.

In the state in which the first insulators 32 and the second insulators 33 are disposed in an alternating manner in the circumferential direction, the outer-wall parts 52 and the outer-wall parts 72 are connected, and thereby an outer-side, tubular part 110 is formed. In addition, in the state in which the first insulators 32 and the second insulators 33 are disposed in an alternating manner in the circumferential direction, the inner-wall parts 53 and the inner-wall parts 73 are connected, and thereby an inner-side, tubular part 120 is formed.

The outer-wall parts 52 and the outer-wall parts 72 that are adjacent are connected at their corresponding thin-walled part 55 and thin-walled part 75. The inner-wall parts 53 and the inner-wall parts 73 that are adjacent are connected at their corresponding thin-walled part 61 and thin-walled part 81.

The outer surfaces of the outer-wall parts 52 of the first insulators 32 are in tight contact with the inner surface of the circular-ring part 41. The outer surfaces of the outer-wall parts 72 of the second insulators 33 are in tight contact with the inner surface of the circular-ring part 41. The tilted parts 56 of the first insulators 32 are in tight contact with the tilted parts 41*a* of the circular-ring part 41. The tilted parts 76 of the second insulators 33 are in tight contact with the tilted parts 41*a* of the circular-ring part 41. Thereby, each of the first insulators 32 and each of the second insulators 33 are positioned in the axial direction and the circumferential direction relative to the outer-side member 40.

Figure 11:
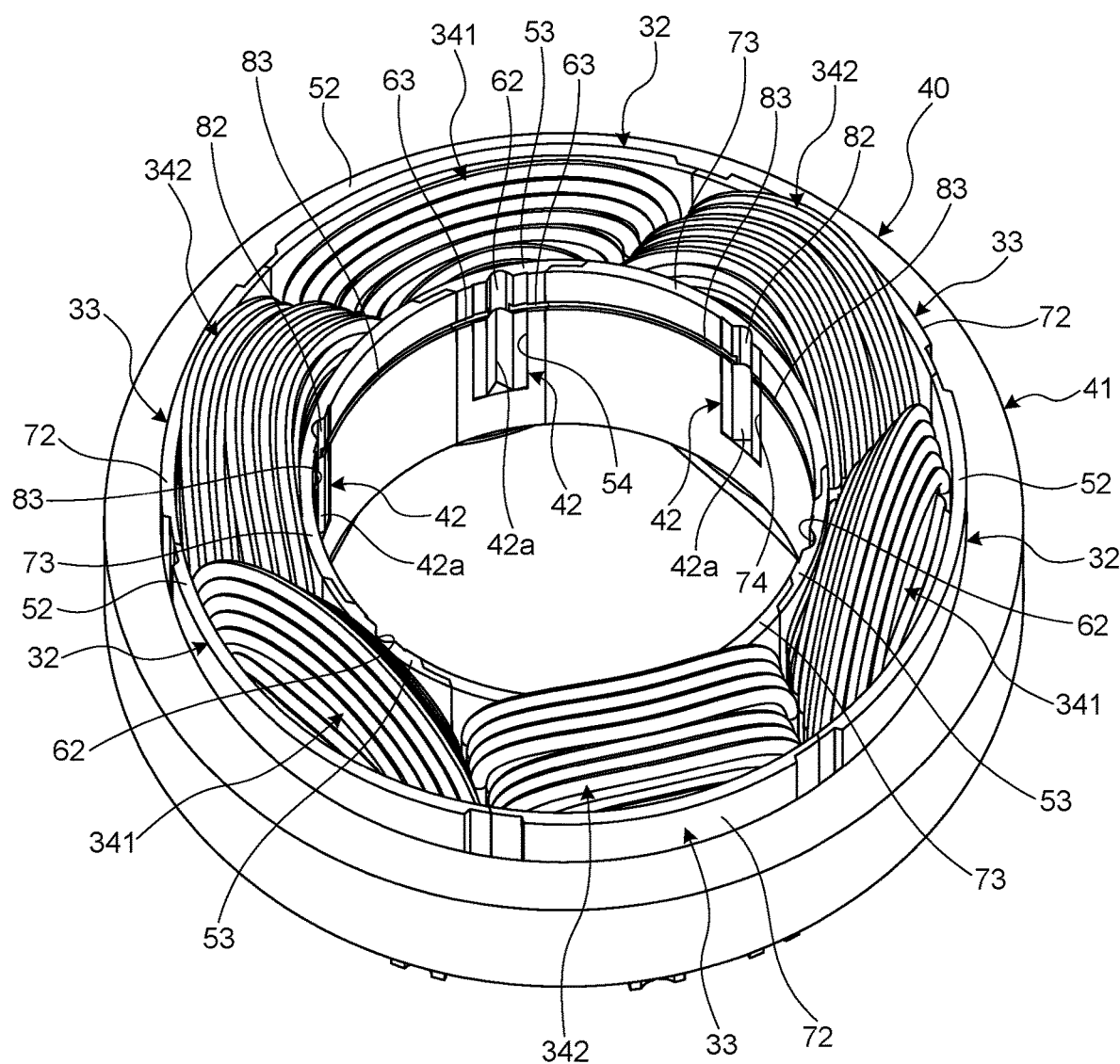
FIG. 11 is an oblique view that shows the outer-side member, on which the first insulators, whereon the first coils have been wound, and the second insulators, whereon the second coils have been wound, are mounted according to the present embodiment.

FIG. 11 is an oblique view that shows the outer-side member 40 on which the first insulators 32, whereon the coils 34 have been wound, and the second insulators 33, whereon the coils 34 have been wound, are mounted according to the present embodiment.

As shown in FIG. 11, the projection parts 42 have the engaging-groove parts 42*a*, which extend in the axial direction. The engaging-groove parts 42*a* are provided in the inner-end portions of the projection parts 42. Three of the projection parts 42 are inserted into the through holes 54 of the first insulators 32, respectively. Three of the projection parts 42 are inserted into the through holes 74 of the second insulators 33, respectively. In the state in which the projection parts 42 have been inserted into the through holes 54 of the first insulators 32, the engaging-groove parts 42*a* face a space inward of the outer-side member 40. Likewise, in the state in which the projection parts 42 have been inserted into the through holes 74 of the second insulators 33, the engaging-groove parts 42*a* face a space inward of the outer-side member 40.

With regard to the projection parts 42, which are inserted into the through holes 54 of the first insulators 32, the communicating-groove parts 62 are disposed at other-end portions of the engaging-groove parts 42*a* in the axial direction. The communicating-groove parts 62 communicate with the engaging-groove parts 42*a* in the axial direction. A difference in level is not provided between the inner surfaces of the engaging-groove parts 42*a* and the inner surfaces of the communicating-groove parts 62. By virtue of the communicating-groove parts 62 being disposed at the other-end portions of the engaging-groove parts 42*a* in the axial direction, the other-end portions of the engaging-groove parts 42*a* are open.

The inner surfaces of the through holes 54 are disposed at one-end portions of the engaging-groove parts 42*a* in the axial direction. By disposing the inner surfaces of the through holes 54 at the one-end portions of the engaging-groove parts 42*a* in the axial direction, the one-end portions of the engaging-groove parts 42*a* are closed up. The inner surfaces of the through holes 54 function as stoppers that close up the one-end portions of the engaging-groove parts 42*a*.

With regard to the projection parts 42, which are inserted into the through holes 74 of the second insulators 33, the communicating-groove parts 82 are disposed at other-end portions of the engaging-groove parts 42*a* in the axial direction. The communicating-groove parts 82 communicate with the engaging-groove parts 42*a* in the axial direction. A difference in level is not provided between the inner surfaces of the engaging-groove parts 42a and the inner surfaces of the communicating-groove parts 82. By disposing the communicating-groove parts 82 at the other-end portions of the engaging-groove parts 42a in the axial direction, the other-end portions of the engaging-groove parts 42a are open.

The inner surfaces of the through holes 74 are disposed at one-end portions of the engaging-groove parts 42a in the axial direction. By disposing the inner surfaces of the through holes 74 at the one-end portions of the engaging-groove parts 42a in the axial direction, the one-end portions of the engaging-groove parts 42a are closed up. The inner surfaces of the through holes 74 function as stoppers that close up the one-end portions of the engaging-groove parts 42a.

In addition, the latching-groove parts 63 of the first insulators 32 and the latching-groove parts 83 of the second insulators 33 communicate in the circumferential direction in regions other than the communicating-groove parts 62 and the communicating-groove parts 82.

Figure 12:
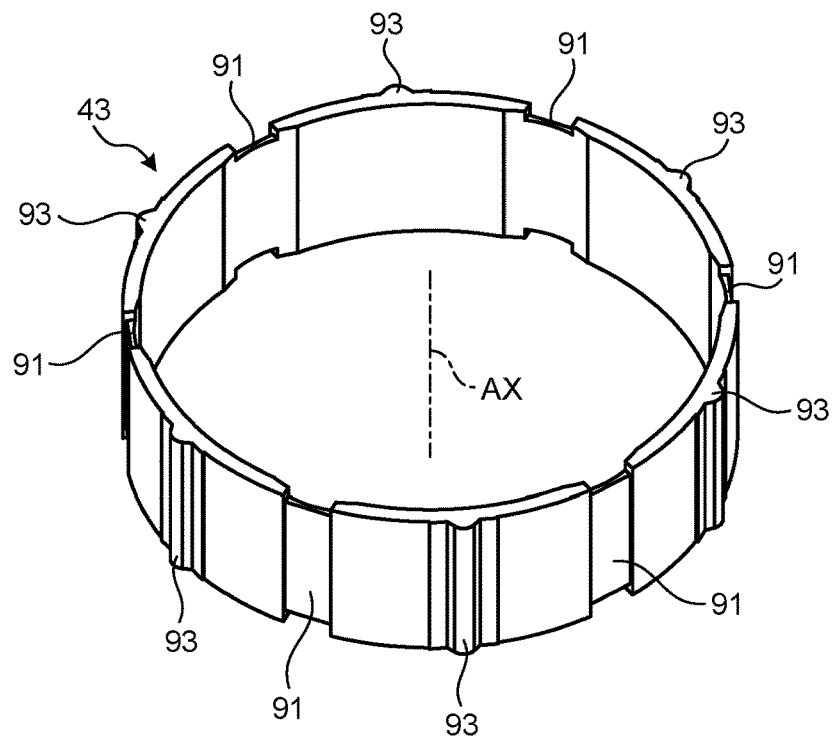
FIG. 12 is an oblique view that shows an inner-side member according to the present embodiment.
Figure 13:
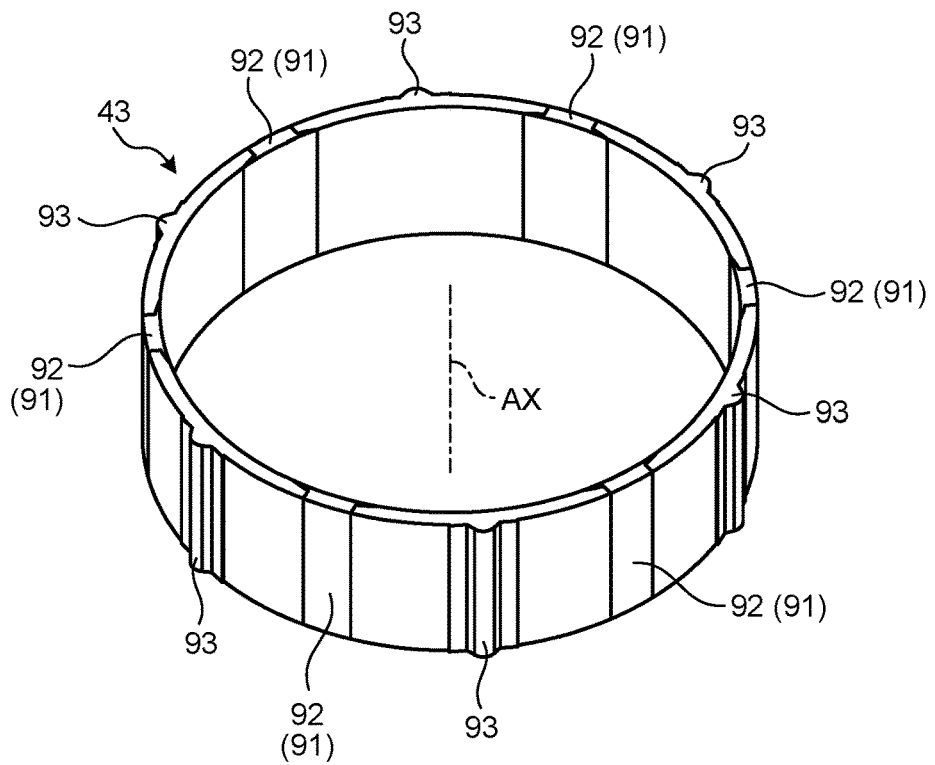
FIG. 13 is an oblique view that shows the inner-side member, on which resin layers are provided, according to the present embodiment.

FIG. 12 is an oblique view that shows the inner-side member 43 according to the present embodiment. FIG. 13 is an oblique view that shows the inner-side member 43, on which resin layers 92 have been provided, according to the present embodiment.

The inner-side member 43 comprises a plurality of steel sheets stacked in the axial direction. The steel sheets are sheets made of a metal whose main component is iron. The inner-side member 43 is formed by stacking the plurality of steel sheets. The inner-side member 43 is disposed around the rotational axis AX. The inner-side member 43 has a tube shape.

The dimension of the inner-side member 43 in the axial direction is constant. The end surfaces of the inner-side member 43 in the axial direction are orthogonal to the rotational axis AX. In the present embodiment, the dimension of the outer-side member 40 in the axial direction is identical to the dimension of the inner-side member 43 in the axial direction.

As shown in FIG. 12, the inner-side member 43 comprises a plurality of thin parts 91 provided spaced apart in the circumferential direction. The dimension of the thin parts 91 of the inner-side member 43 in the axial direction is smaller than the dimension of the inner-side member 43 in the axial direction at the portions other than the thin parts 91. In addition, the dimension of the thin parts 91 of the inner-side member 43 in the radial direction is smaller than the dimension of the inner-side member 43 in the radial direction at the portions other than the thin parts 91.

It is noted that the dimension of the thin parts 91 of the inner-side member 43 in the axial direction may be smaller than the dimension of the inner-side member 43 in the axial direction at the portions other than the thin parts 91, or the dimension of the thin parts 91 of the inner-side member 43 in the radial direction may be identical to the dimension of the inner-side member 43 in the radial direction at the portions other than the thin parts 91. It is noted that the dimension of the thin parts 91 of the inner-side member 43 in the radial direction may be smaller than the dimension of the inner-side member 43 in the radial direction at the portions other than the thin parts 91, or the dimension of the thin parts 91 of the inner-side member 43 in the axial direction may be identical to the dimension of the inner-side member 43 in the axial direction at the portions other than the thin parts 91.

As shown in FIG. 13, the resin layers 92 are provided on the thin parts 91. The resin layers 92 are disposed such that they cover the surfaces of the thin parts 91. The resin layers 92 are provided on the thin parts 91 such that the surfaces of the resin layers 92 and the surfaces of the inner-side member 43 around the resin layers 92 are disposed within the same plane.

The inner-side member 43 comprises a plurality of engaging-protrusion parts 93 provided spaced apart in the circumferential direction. The engaging-protrusion parts 93 are provided on an outer surface of the inner-side member 43. In the present embodiment, six of the engaging-protrusion parts 93 are provided in the circumferential direction.

The engaging-protrusion parts 93 protrude outward in the radial direction from the outer surface of the inner-side member 43. The engaging-protrusion parts 93 extend in the axial direction. The engaging-protrusion parts 93 engage with the engaging-groove parts 42a of the projection parts 42. In addition, the engaging-protrusion parts 93 engage with the communicating-groove parts 62 of the first insulators 32 and the communicating-groove parts 82 of the second insulators 33. The locations of the engaging-protrusion parts 93 in the circumferential direction are determined based on the locations of the engaging-groove parts 42a, the communicating-groove parts 62, and the communicating-groove parts 82 in the circumferential direction. The thin parts 91 and the resin layers 92 are provided between engaging-protrusion parts 93 that are adjacent in the circumferential direction.

Figure 14:
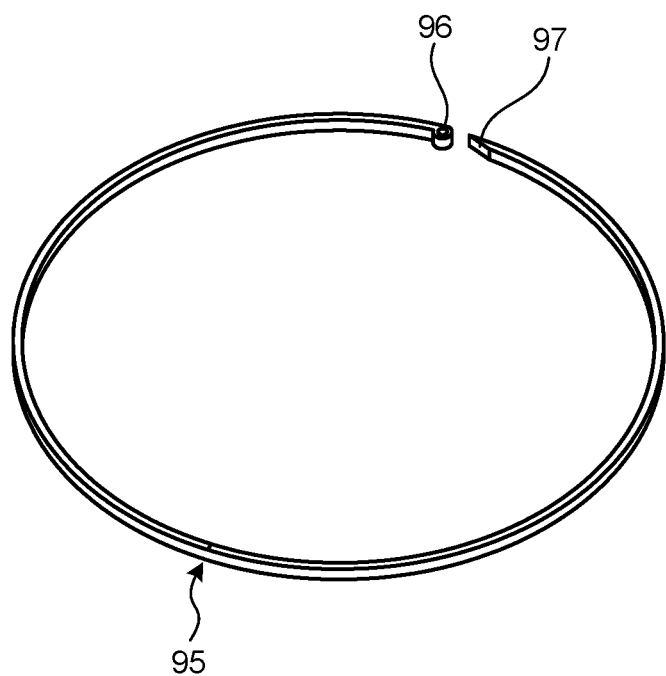
FIG. 14 is an oblique view that shows a latching member according to the present embodiment.

FIG. 14 is an oblique view of a latching member 95 according to the present embodiment. As shown in FIG. 14, the latching member 95 has a ring shape, a portion of which is broken. The latching member 95 comprises a ring part 96, which is provided on one-end portion in the circumferential direction, and a tapered part 97, which is provided on the other-end portion in the circumferential direction. The latching member 95 is latched in the latching-groove parts 63 of the first insulators 32 and the latching-groove parts 83 of the second insulators 33. The dimension of the latching member 95 in the circumferential direction is smaller than the dimension of the latching-groove parts 63 and the dimension of the latching-groove parts 83 in the circumferential direction. The latching member 95 is an elastic member. In the state in which an external force is not imparted, the outer diameter of the latching member 95 is larger than the inner diameter of the latching-groove parts 63 and the inner diameter of the latching-groove parts 83. The latching member 95 is latched to the latching-groove parts 63 and the latching-groove parts 83 by the elastic force.

Figure 15:
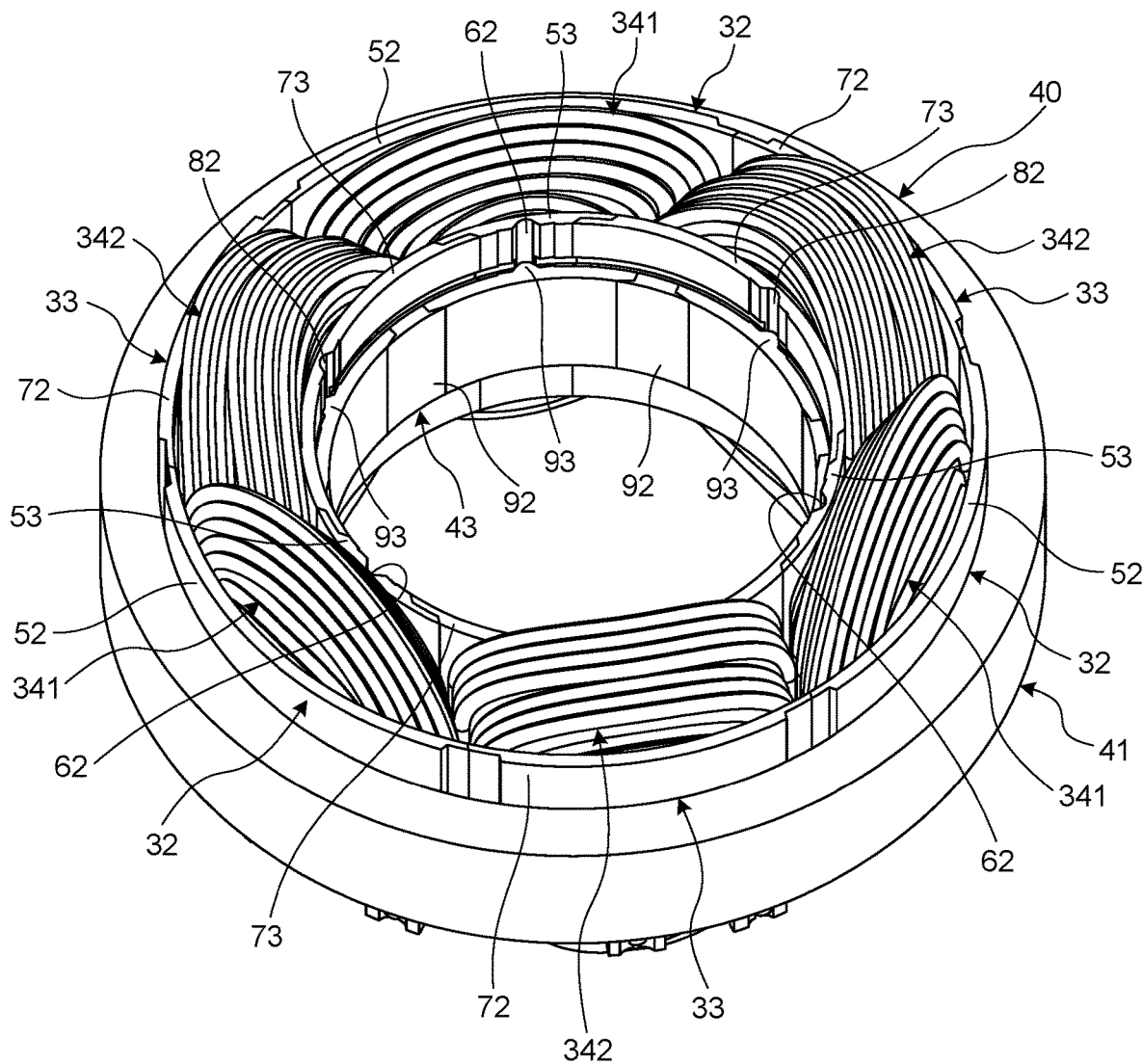
FIG. 15 is an oblique view that shows the state in which the outer-side member and the inner-side member are coupled, according to the present embodiment.
Figure 16:
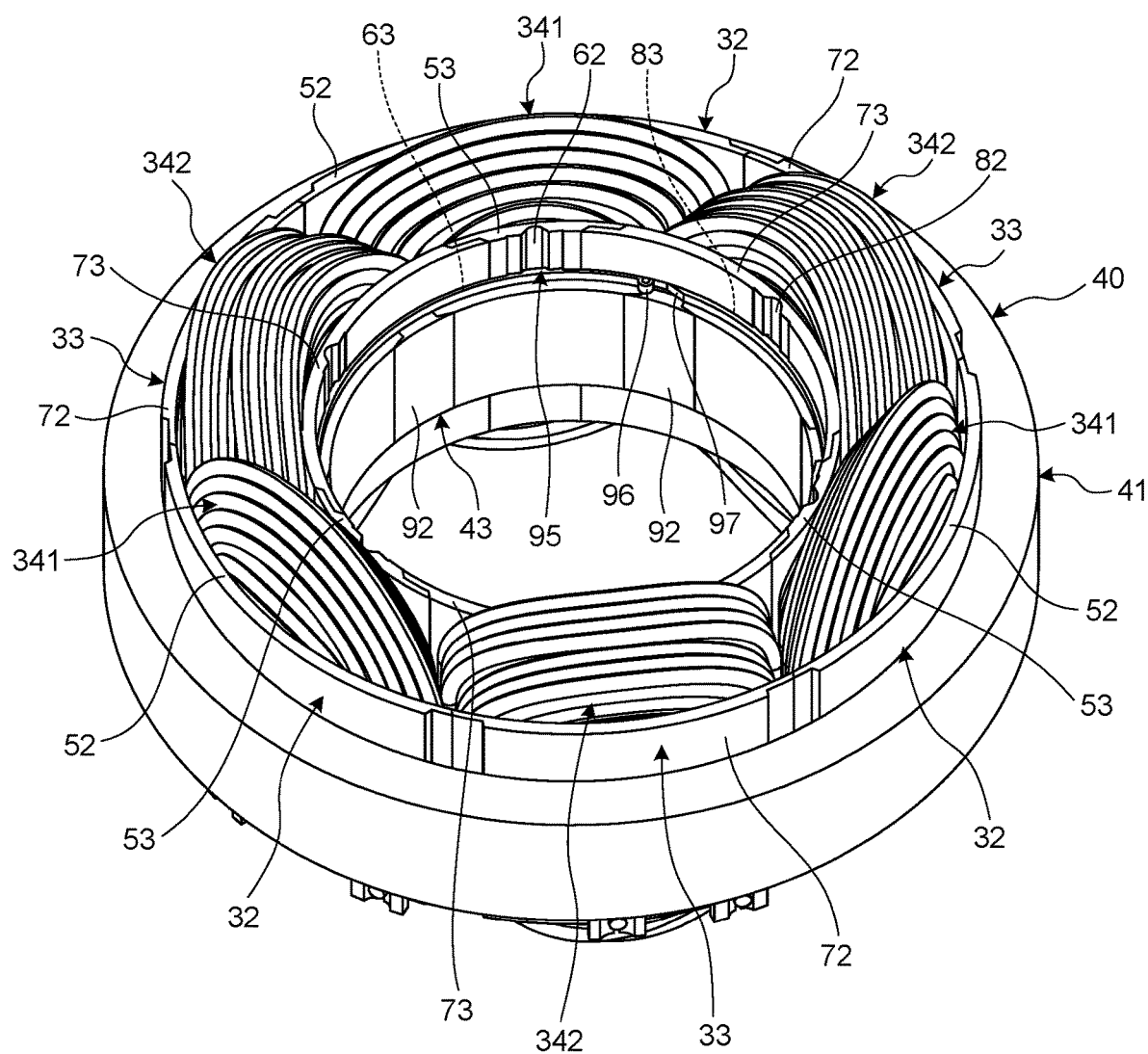
FIG. 16 is an oblique view that shows the state in which the latching member is provided on the outer-side member and the inner-side member according to the present embodiment.
Figure 17:
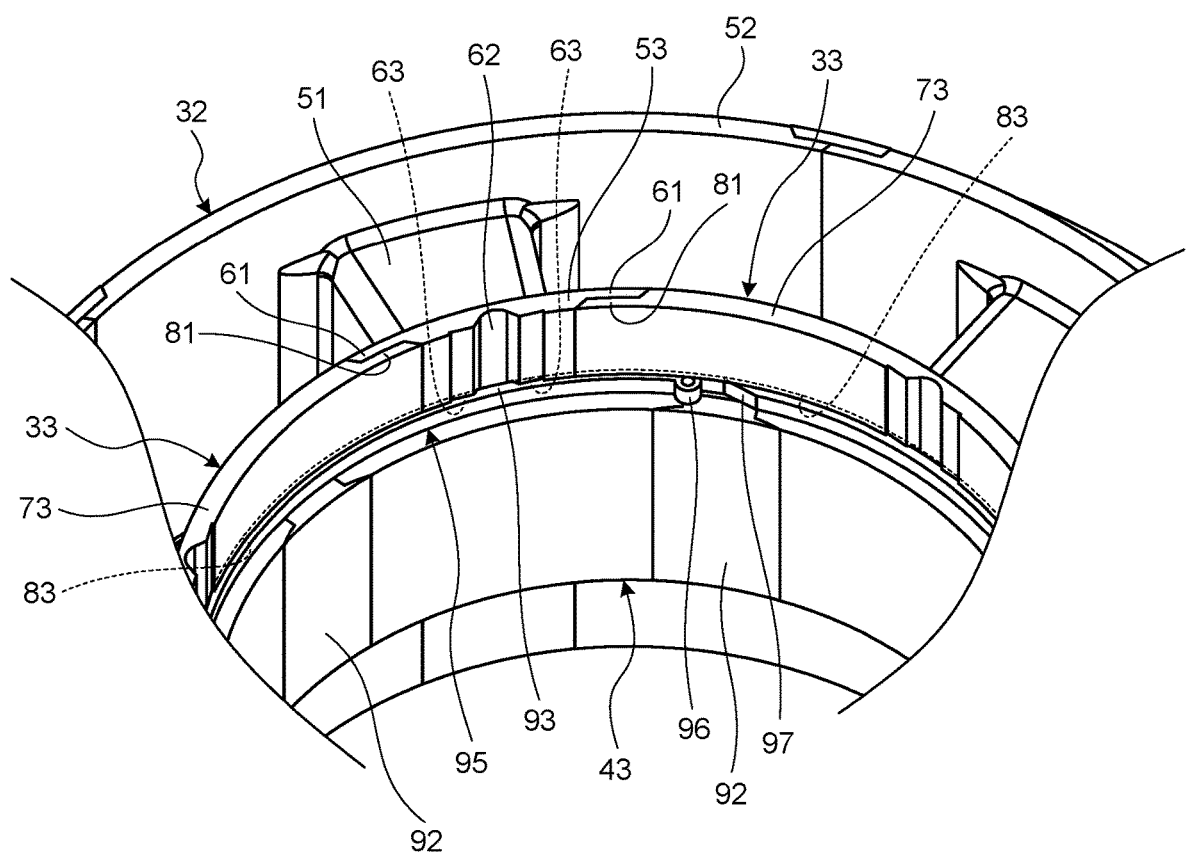
FIG. 17 is an enlarged view of the principal parts that shows the latching member according to the present embodiment.

FIG. 15 is an oblique view that shows the state in which the outer-side member 40 and the inner-side member 43 are coupled to one another according to the present embodiment. FIG. 16 is an oblique view that shows the state in which the latching member 95 is provided on the outer-side member 40 and the inner-side member 43 according to the present embodiment. FIG. 17 is an enlarged view of the principal parts that shows the latching member 95 according to the present embodiment. It is noted that, in FIG. 17, the coils 34 are omitted.

As shown in FIG. 15, the inner-side member 43 is inserted, inward of the outer-side member 40, from the other side in the axial direction. Three of the engaging-protrusion parts 93 of the inner-side member 43 are inserted into the engaging-groove parts 42a via the communicating-groove parts 62. Because the other-end portions of the engaging-groove parts 42a in the axial direction are open, the engaging-protrusion parts 93 are insertable into the engaging-groove parts 42a from the other side in the axial direction. The engaging-protrusion parts 93 mate with the engaging-groove parts 42a. Likewise, three of the engaging-protrusion parts 93 of the inner-side member 43 are inserted into the engaging-groove parts 42a via the communicating-groove parts 82.

With regard to the projection parts 42, which are inserted into the through holes 54 of the first insulators 32, the one-end portions of the engaging-groove parts 42a in the axial direction are closed up by the inner surfaces of the through holes 54. The engaging-protrusion parts 93 are positioned in the axial direction by making contact with the inner surfaces of the through holes 54. Likewise, with regard to the projection parts 42, which are inserted into the through holes 74 of the second insulators 33, the one-end portions of the engaging-groove parts 42a in the axial direction are closed up by the inner surfaces of the through holes 74. The engaging-protrusion parts 93 are positioned in the axial direction by making contact with the inner surfaces of the through holes 74.

After the engaging-protrusion parts 93 have been mated with the engaging-groove parts 42a (refer to FIG. 11, etc.) and the inner-side member 43 has been coupled with the outer-side member 40, the latching member 95 is disposed in the latching-groove parts 63 and the latching-groove parts 83. The latching member 95 is disposed in order to curtail the coming off of the engaging-protrusion parts 93 from the other-end portions of the engaging-groove parts 42a. The latching member 95 is latched to the latching-groove parts 63 and the latching-groove parts 83 so as to close up the other-end portions of the engaging-groove parts 42a. The coming off of the engaging-protrusion parts 93 from the other-end portions of the engaging-groove parts 42a is curtailed by the latching member 95.

When the engaging-protrusion parts 93 of the inner-side member 43 have been mated with the engaging-groove parts 42a of the projection parts 42 (refer to FIG. 11, etc.), the outer surface of the inner-side member 43 makes tight contact with the inner surfaces of the first insulators 32 and the inner surfaces of the second insulators 33. Thereby, the coming off of the first insulators 32 and the second insulators 33 from the projection parts 42 is curtailed.

The end surface of the inner-side member 43 on one side in the axial direction contacts the inner surfaces of the through holes 54 and the inner surfaces of the through holes 74, which function as a stopper. The end surface of the inner-side member 43 on the other side in the axial direction contacts the latching-groove parts 63 and the latching member 95, which is disposed in the latching-groove parts 83. Thereby, the inner-side member 43 is fixed.

As shown in FIG. 2, in the state in which the stator core 31, the first insulators 32, the second insulators 33, and the coils 34 have been assembled, the short-circuiting member 35 is assembled. The six coils 34 are electrically connected as a U (W-U) phase, a V (U-V) phase, and a W (V-W) phase. Pairs of the coils 34 are allocated to each of the U phase, the V phase, and the W phase.

Figure 18:
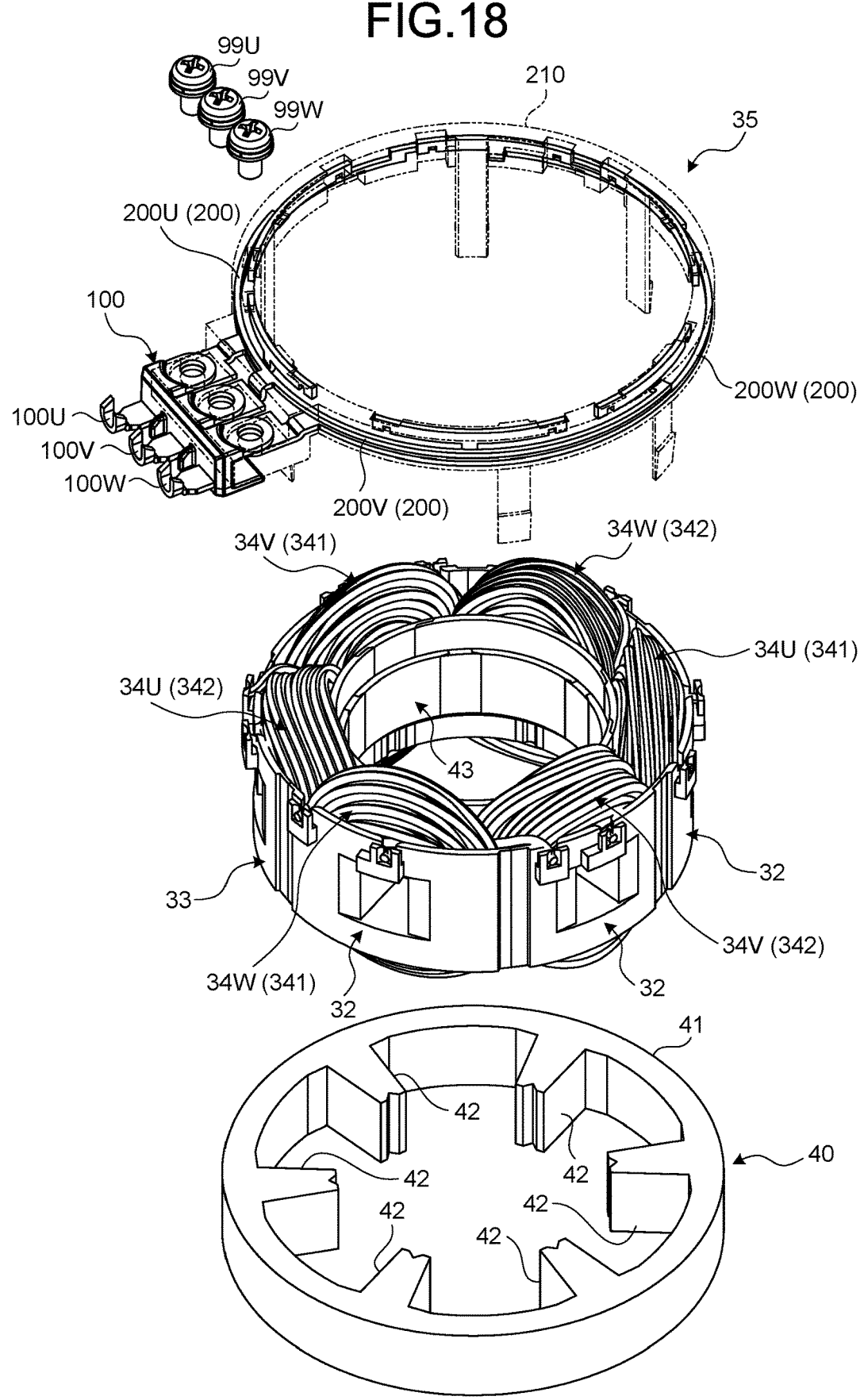
FIG. 18 is an oblique view that shows a short-circuiting member, the inner-side member, on which coils are provided, and the outer-side member according to the present embodiment.
Figure 19:
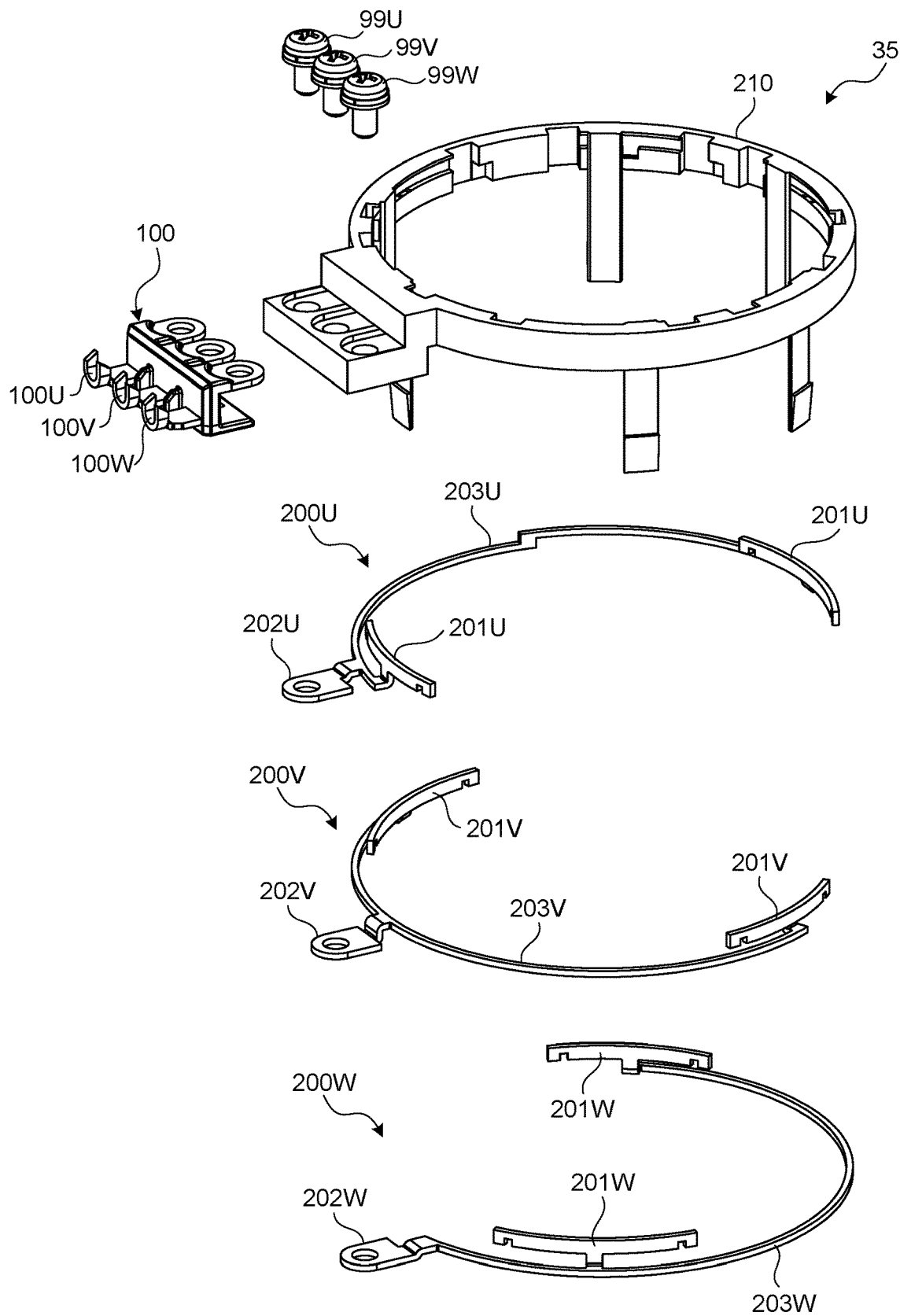
FIG. 19 is an exploded oblique view that shows the short-circuiting member according to the present embodiment.

FIG. 18 is an oblique view that shows the short-circuiting member 35, and the inner-side member 43 and the outer-side member 40, on which the coils 34 are provided, according to the present embodiment. FIG. 19 is an exploded oblique view that shows the short-circuiting member 35 according to the present embodiment. In the explanation below, the coils 34 allocated to the U phase are called U-phase coils 34U where appropriate, the coils 34 allocated to the V phase are called V-phase coils 34V where appropriate, and the coils 34 allocated to the W phase are called W-phase coils 34W where appropriate.

As shown in FIG. 18, the pair of the U-phase coils 34U is disposed such that the U-phase coils 34U oppose one another in the radial direction. The pair of the V-phase coils 34V is disposed such that the V-phase coils 34V oppose one another in the radial direction. The pair of the W-phase coils 34W is disposed such that the W-phase coils 34W oppose one another in the radial direction. The pair of the U-phase coils 34U comprises one of the first coils 341 and one of the second coils 342. The pair of the V-phase coils 34V comprises one of the first coils 341 and one of the second coils 342. The pair of the W-phase coils 34W comprises one of the first coils 341 and one of the second coils 342.

The short-circuiting member 35 comprises a plurality of sheet-metal members 200 and a holding member 210, which holds the sheet-metal members 200. The holding member 210 is formed of an electrically insulating material such as a synthetic resin. The short-circuiting member 35 has a circular-ring shape that is smaller than the outer diameter of the circular-ring part 41.

The sheet-metal members 200 are connected to power-supply lines via a power-supply member 100. The power-supply member 100 is disposed partially around the short-circuiting member 35. In addition, the sheet-metal members 200 are connected to the coils 34. Electric power from the power-supply lines is supplied to the coils 34 via the power-supply member 100 and the sheet-metal members 200.

The sheet-metal members 200 comprise a U-phase, sheet-metal member 200U, a V-phase, sheet-metal member 200V, and a W-phase, sheet-metal member 200W. The plurality of coils 34 is electrically connected by the plurality of sheet-metal members 200.

The power-supply member 100 comprises a U-phase, power-supply part 100U, a V-phase, power-supply part 100V, and a W-phase, power-supply part 100W. The U-phase, power-supply part 100U, the V-phase, power-supply part 100V, and the W-phase, power-supply part 100W are respectively connected to the power-supply lines. The U-phase, sheet-metal member 200U is fixed to the U-phase, power-supply part 100U by a bolt 99U. The V-phase, sheet-metal member 200V is fixed to the V-phase, power-supply part 100V by a bolt 99V. The W-phase, sheet-metal member 200W is fixed to the W-phase, power-supply part 100W by a bolt 99W.

As shown in FIG. 18 and FIG. 19, each of the sheet-metal members 200 has an arcuate shape. The U-phase, sheet-metal member 200U, the V-phase, sheet-metal member 200V, and the W-phase, sheet-metal member 200W are disposed in the axial direction.

The U-phase, sheet-metal member 200U comprises: terminal parts 201U, which connect the W-phase coils 34W and the U-phase coils 34U that are adjacent; a connecting part 202U, which is connected to the U-phase, power-supply part 100U; and an arcuate part 203U, which connects the connecting part 202U and the terminal parts 201U. Two of the terminal parts 201U are provided. Each of the two terminal parts 201U connects the W-phase coils 34W and the U-phase coils 34U that are adjacent. One of the terminal parts 201U connects the first coil 341 that is the W-phase coil 34W and the second coil 342 that is the U-phase coil 34U. One of the terminal parts 201U connects the end portion at the end of the winding of the first coil 341 and the end portion of the start of the winding of the second coil 342. The other terminal part 201U connects the second coil 342 that is the W-phase coil 34W and the first coil 341 that is the U-phase coil 34U. The other terminal part 201U connects the end portion at the end of the winding of the second coil 342 and the end portion of the start of the winding of the first coil 341.

The V-phase, sheet-metal member 200V comprises: terminal parts 201V, which connect the U-phase coils 34U and the V-phase coils 34V that are adjacent; a connecting part 202V, which is connected to the V-phase, power-supply part 100V; and an arcuate part 203V, which connects the connecting part 202V and the terminal parts 201V. Two of the terminal parts 201V are provided. Each of the two terminal parts 201V connects the U-phase coils 34U and the V-phase coils 34V that are adjacent. One of the terminal parts 201V connects the second coil 342 that is the U-phase coil 34U and the first coil 341 that is the V-phase coil 34V. One of the terminal parts 201V connects the end portion at the end of the winding of the second coil 342 and the end portion of the start of the winding of the first coil 341. The other terminal part 201V connects the first coil 341 that is the U-phase coil 34U and the second coil 342 that is the V-phase coil 34V. The other terminal part 201V connects the end portion at the end of the winding of the first coil 341 and the end portion of the start of the winding of the second coil 342.

The W-phase, sheet-metal member 200W comprises: terminal parts 201W, which connect the V-phase coils 34V and the W-phase coils 34W that are adjacent; a connecting part 202W, which is connected to the W-phase, power-supply part 100W; and an arcuate part 203W, which connects the connecting part 202W and the terminal parts 201W. Two of the terminal parts 201W are provided. Each of the two terminal parts 201W connects the V-phase coils 34V and the W-phase coils 34W that are adjacent. One of the terminal parts 201W connects the first coil 341 that is the V-phase coil 34V and the second coil 342 that is the W-phase coil 34W. One of the terminal parts 201W connects the end portion at the end of the winding of the first coil 341 and the end portion of the start of the winding of the second coil 342. The other terminal part 201W connects the second coil 342 that is the V-phase coil 34V and the first coil 341 that is the W-phase coil 34W. The other terminal part 201W connects the end portion at the end of the winding of the second coil 342 and the end portion of the start of the winding of the first coil 341.

[Effects]

According to the present embodiment as explained above, the stator core 31 has a divided structure that comprises the outer-side member 40 and the inner-side member 43, which is disposed inward of the outer-side member 40. The outer-side member 40 comprises the circular-ring part 41 and the plurality of projection parts 42, the projection parts 42 protruding inward in the radial direction from the circular-ring part 41 and being disposed spaced apart in the circumferential direction. The projection parts 42 function as teeth around which the coils 34 are wound. According to the present embodiment, because the circular-ring part 41 and the plurality of projection parts 42 are a single member, deviations in the relative positions of the projection parts 42 (teeth) are curtailed.

Because the plurality of projection parts 42 is provided inward in the radial direction of the circular-ring part 41, the first insulators 32 and the second insulators 33 can be inserted smoothly into the projection parts 42. The coils 34 are wound in the state in which the first insulators 32 and the second insulators 33 are not mounted on the outer-side member 40. For example, in the situation in which the first coils 341 are wound on the first insulators 32, the first coils 341 can be wound on the first insulators 32 in the state in which the first insulators 32 are not mounted on the outer-side member 40. Consequently, in the situation in which, for example, the first coils 341 are wound using the nozzle method, sufficient space for the nozzle to move is ensured.

Accordingly, the work of winding the first coils 341 on the projection parts 42 can be performed efficiently. In addition, regardless of the method of winding the first coils 341, the first coils 341 can be properly wound on the first insulators 32 in a lined-up state. Consequently, the space factor of the first coils 341 is increased. In addition, because the first coils 341 can be wound on the first insulators 32 before the first insulators 32 are mounted on the outer-side member 40, the nozzle can freely approach the first coils 341. Consequently, the outer shape of the first coils 341 can be optimized easily to increase the space factor. Because the coating agent can be applied easily to the first coils 341, the durability, the dustproof characteristics, and the waterproofness of the first coils 341 can be increased. In addition, an illustrative example of the protective agent is given. In addition, deformation of the first coils 341 is curtailed by applying the coating agent to the first coils 341. The same applies also for the second coils 342, which are wound on the second insulators 33.

In addition, the circular-ring part 41 and the plurality of projection parts 42 are integral. Consequently, a division of the magnetic-flux path can be curtailed more than, for example, in a divided structure in which the stator core is divided in the circumferential direction. In addition, the inner-side member 43 is coupled to the inner-end portions of the projection parts 42. Consequently, the outer-side member 40 and the inner-side member 43 are properly coupled. Thereby, a division of the magnetic-flux path can be curtailed even at the boundary between the outer-side member 40 and the inner-side member 43. Accordingly, a decrease in the reliability of the motor 8 is curtailed.

In addition, by making the stator core 31 a divided structure, the opening of the inner-side member 43 can be made large. Thereby, the rotor 23 disposed in the opening of the inner-side member 43 can be made large. In addition, because it becomes possible to enlarge the bearing that supports the rotary shaft 22 of the rotor 23, an increase in the performance of the motor 8 can be achieved. In addition, in the situation in which the air that flows in via the air-intake ports 3a circulates through the opening of the circular-ring part 41, that air can circulate smoothly because the opening of the inner-side member 43 is large. Accordingly, the motor 8 is cooled efficiently by the air.

The end portions of the first insulators 32 that are outward in the radial direction are coupled to the circular-ring part 41 of the outer-side member 40, and the end portions of the first insulators 32 that are inward in the radial direction are coupled to the inner-side member 43. Consequently, the first insulators 32, on which the first coils 341 have been wound, are properly disposed relative to the outer-side member 40 and the inner-side member 43. This applies likewise to the second insulators 33.

Each of the first insulators 32 comprises the tube part 51, the outer-wall part 52, which is provided on the end portion of the tube part 51 that is outward in the radial direction, and the inner-wall part 53, which is provided on the end portion of the tube part 51 that is inward in the radial direction. Thereby, the first coil 341 is properly wound on the tube part 51 while being supported by the outer-wall part 52 and the inner-wall part 53. This applies likewise to each of the second insulators 33.

In addition, in the situation in which the first insulators 32 and the second insulators 33 are disposed in the circumferential direction on the stator core 31, the outer-side, tubular part 110 is formed of the plurality of outer-wall parts 52 and the plurality of outer-wall parts 72, and the inner-side, tubular part 120 is formed of the plurality of inner-wall parts 53 and the plurality of inner-wall parts 73. Because the plurality of first insulators 32 and the plurality of second insulators 33 become integral, the strength of the stator core 31 is increased.

With regard to each of the first insulators 32, the dimension of the outer-wall part 52 in the circumferential direction is larger than the dimension of the inner-wall part 53 in the circumferential direction. With regard to each of the second insulators 33, the dimension of the outer-wall part 72 in the circumferential direction is smaller than the dimension of the inner-wall part 53 in the circumferential direction. The first insulators 32 and the second insulators 33 are disposed in an alternating manner in the circumferential direction. By performing the work of inserting the second insulators 33 after the work of inserting the first insulators 32 onto the projection parts 42, the first insulators 32 and the second insulators 33 can be inserted smoothly onto the projection parts 42.

The latching parts 59 and the latching parts 60, to which the end portions of the first coils 341 are latched, are provided on the outer-wall parts 52 of the first insulators 32. Consequently, the first coils 341 are properly held by the first insulators 32. This applies likewise to the second insulators 33.

The tilted parts 56, which tilt as they go toward the inner surfaces of the tube parts 51, are provided on the outer surfaces of the outer-wall parts 52 of the first insulators 32. The tilted parts 56 make tight contact with the tilted parts 41a of the circular-ring part 41. Consequently, the first insulators 32 are properly positioned on the outer-side member 40. This applies likewise to the second insulators 33.

The outer-side member 40 and the inner-side member 43 are positioned with high accuracy by virtue of the engaging-groove parts 42a being provided on the projection parts 42, the engaging-protrusion parts 93 being provided on the inner-side member 43, and the engaging-protrusion parts 93 mating with the engaging-groove parts 42a.

The one-end portions of the engaging-groove parts 42a in the axial direction are closed up, and the other-end portions of the engaging-groove parts 42a are open. Consequently, the engaging-protrusion parts 93 can be inserted smoothly into the engaging-groove parts 42a from the other-end portions of the engaging-groove parts 42a. In addition, by virtue of the one-end portions of the engaging-groove parts 42a being closed up, the engaging-protrusion parts 93 are positioned in the axial direction.

The one-end portions of the engaging-groove parts 42a are closed up by the inner surfaces of the through holes 54, which are provided in the first insulators 32, and the other-end portions of the engaging-groove parts 42a are open owing to the communication with the communicating-groove parts 62 provided in the first insulators 32. Consequently, the mounting and positioning of the inner-side members 43 relative to the projection parts 42 can be performed easily. This applies likewise to the second insulators 33.

The coming off of the engaging-protrusion parts 93 from the engaging-groove parts 42a is curtailed by the provision of the latching member 95, which closes up the other-end portions of the engaging-groove parts 42a.

The thin parts 91 are provided on the inner-side member 43, and the resin layers 92 are provided on the thin parts 91. Because the circulation of the magnetic flux in the thin parts 91 is curtailed, a proper magnetic field is generated. In addition, by providing the resin layers 92 on the thin parts 91, a decrease in the stiffness of the inner-side member 43 is curtailed.

Other Embodiments

In the embodiments described above, it was assumed that the first insulators 32 and the second insulators 33 are inserted onto the projection parts 42 after the coils 34 have been wound on the first insulators 32 and the second insulators 33, which are separable from the outer-side member 40. The coils 34 may be wound around the projection parts 42 in the state in which insulators are provided on the surfaces of the projection parts 42.

It is noted that, in the embodiments described above, it was assumed that the electric power tool 1 is a hammer driver-drill. The electric power tool 1 is not limited to being a hammer driver-drill. A driver drill, an angle drill, an impact driver, a grinder, a hammer, a hammer drill, a circular saw, and a reciprocating saw are illustrative examples of the electric power tool 1.

In the embodiments described above, it was assumed that the electric work machine is an electric power tool. The electric work machine is not limited to being an electric power tool. A gardening tool is an illustrative example of an electric work machine. A chain saw, a hedge trimmer, a lawn mower, a mowing machine, and a blower are illustrative examples of gardening tools.

In the embodiments described above, it was assumed that the battery pack 11, which is mounted on the battery-mounting part 7, is used as the power supply of the electric work machine. A commercial power supply (AC power supply) may be used as the power supply of the electric work machine.

EXPLANATION OF THE REFERENCE NUMBERS

1 Electric power tool (electric work machine)
2 Grip housing
3 Main-body housing
3a Air-intake port
3b Air-exhaust port
4 Motor housing
5 Gear housing
6 Output shaft
7 Battery-mounting part
8 Motor
9 Rear cover
10 Power-transmission mechanism
11 Battery pack
12 Trigger switch
13 Forward/reverse-changing lever
14 Speed-changing lever
15 Mode-change ring
16 Change ring
17 Light
18 Controller
21 Stator
22 Rotary shaft
23 Rotor
31 Stator core
32 First insulator
33 Second insulator
34 Coil
34U U-phase coil
34V V-phase coil 34W W-phase coil
35 Short-circuiting member
40 Outer-side member
41 Circular-ring part
41a Tilted part
42 Projection part
42a Engaging-groove part
43 Inner-side member
51 Tube part
52 Outer-wall part
53 Inner-wall part
54 Through hole (stopper)
55 Thin-walled part
56 Tilted part
57 Notched part
58 Notched part
59 Latching part
60 Latching part
61 Thin-walled part
62 Communicating-groove part
63 Latching-groove part
71 Tube part
72 Outer-wall part
73 Inner-wall part
74 Through hole (stopper)
75 Thin-walled part
76 Tilted part
77 Notched part
78 Notched part
79 Latching part
80 Latching part
81 Thin-walled part
82 Communicating-groove part
83 Latching-groove part
91 Thin part
92 Resin layer
93 Engaging-protrusion part
95 Latching member
96 Ring part
97 Tapered part
99U Bolt
99V Bolt
99W Bolt
100 Power-supply member
100U U-phase, power-supply part
100V V-phase, power-supply part
100W W-phase, power-supply part
110 Outer-side, tubular part
120 Inner-side, tubular part
200 Sheet-metal member
200U U-phase, sheet-metal member
201U Terminal part
202U Connecting part
203U Arcuate part
200V V-phase, sheet-metal member
201V Terminal part
202V Connecting part
203V Arcuate part
200W W-phase, sheet-metal member
201W Terminal part
202W Connecting part
203W Arcuate part
210 Holding member
341 First coil
342 Second coil
AX Rotational axis

The invention claimed is:
1. An electric work machine comprising:
a motor comprising a stator and a rotor, which is disposed inward of the stator and is rotatable about a rotational axis;
a power-transmission mechanism; and
an output shaft, on which a tool accessory is mounted and that drives the tool accessory using power transmitted from the motor via the power-transmission mechanism;
wherein:
the stator comprises:
a stator core; and
a plurality of coils;
the stator core comprises:
an outer-side member comprising a circular-ring part and a plurality of projection parts, the projection parts protruding from the circular-ring part inward in a radial direction, being disposed spaced apart in a circumferential direction, and supporting the coils; and
an inner-side member disposed inward of the outer-side member and coupled to inner-end portions of the projection parts.
2. The electric work machine according to claim 1, wherein:
the stator comprises an insulator, which is disposed around the projection parts;
the coils are disposed around the insulator; and
the projection parts support the coils via the insulator.
3. The electric work machine according to claim 2, wherein:
a first end portion of the insulator is outward in the radial direction and is coupled to the outer-side member; and
a second end portion of the insulator is inward in the radial direction and is coupled to the inner-side member.
4. The electric work machine according to claim 3, wherein:
the insulator is constituted by a plurality of insulators disposed in the circumferential direction of the stator core;
each of the insulators comprises a tube part, which is disposed around one of the projection parts, an outer-wall part, which is provided at the first end portion of the tube part, and an inner-wall part, which is provided at the second end portion of the tube part; and
in the state in which the plurality of insulators is disposed in the circumferential direction, an outer-side, tubular part is formed by the plurality of outer-wall parts, and an inner-side, tubular part is formed by the plurality of inner-wall parts.
5. The electric work machine according to claim 4, wherein:
the insulators include first insulators, in which the dimension of the outer-wall part in the circumferential direction is larger than the dimension of the inner-wall part in the circumferential direction, and second insulators, in which the dimension of the outer-wall part in the circumferential direction is smaller than the dimension of the inner-wall part in the circumferential direction; and
the first insulators and the second insulators are disposed in an alternating manner in the circumferential direction.
6. The electric work machine according to claim 4, wherein each of the insulators comprises a latching part, which is provided on the outer-wall part and to which an end portion of one of the coils is latched.

7. The electric work machine according to claim 4, wherein each of the insulators comprises tilted parts, which are provided on outer surfaces of the outer-wall parts and tilt inward in the radial direction as the tilted parts extend toward radially inner surfaces of the tube parts.

8. The electric work machine according to claim 2, wherein:
- each of the projection parts comprises an engaging-groove part provided on a radially inner-end portion of the projection part and extending in an axial direction of the stator core; and
- the inner-side member comprises engaging-protrusion parts, which are provided on a radially outer surface of the inner-side member and respectively engage with the engaging-groove parts.

9. The electric work machine according to claim 8, wherein a first end portion of the engaging-groove parts in the axial direction is closed up, and a second end portion of the engaging-groove parts is open.

10. The electric work machine according to claim 9, wherein:
- stoppers are provided on the insulator and are respectively disposed on the first end portions of the engaging-groove parts; and
- communicating-groove parts are provided in the insulator and are respectively disposed on the second end portions of the engaging-groove parts.

11. The electric work machine according to claim 9, further comprising a latching member, which is disposed in a latching-groove part provided in the insulator and closes up the second end portions of the engaging-groove parts.

12. The electric work machine according to claim 8, wherein:
- the inner-side member comprises thin parts provided between adjacent ones of the engaging-protrusion parts in the circumferential direction; and
- resin layers are respectively provided on the thin parts.

13. The electric work machine according to claim 1, wherein:
- the insulator is constituted by connecting a plurality of first insulators and a plurality of second insulators in an alternating manner in the circumferential direction,
- the first insulators each have an outer-wall part that is longer in the circumferential direction than an inner-wall part in the circumferential direction, and
- the second insulators each have an outer-wall part that is shorter in the circumferential direction than an inner-wall part in the circumferential direction.

14. The electric work machine according to claim 1, wherein:
- an engaging-groove part is defined on a radially inward end portion of each of the projection parts and extends in an axial direction;
- engaging-protrusion parts are defined on a radially outer surface of the inner-side member and respectively engage with the engaging-groove parts in a detachable manner;
- a first end portion of the engaging-groove parts in the axial direction is closed up; and
- a second end portion of the engaging-groove parts is open.

15. The electric work machine according to claim 14, further comprising a ring-shaped latching member disposed in a latching groove that extends circumferentially in the insulators, the ring-shaped latching member fixing the inner-side member on the outer-side member.

16. An electric power tool, comprising:
- an electric motor having a rotor disposed within a stator core and being rotatable about a rotational axis, wherein the stator core includes an outer ring having a plurality of projections that extend radially inward, the projections being disposed equispaced around a circumferential direction of the stator core;
- a plurality of gears, an input of the plurality of gears being operably coupled to the rotor;
- an output shaft configured to mount a tool accessory, the output shaft being operably coupled to an output of the plurality of gears;
- a plurality of discrete insulators respectively surrounding the plurality of projections;
- a plurality of coils respectively wound around the plurality of discrete insulators, and
- an inner ring disposed radially inward of the plurality of discrete insulators and the plurality of coils and being detachably coupled to the outer ring.

17. The electric power tool according to claim 16, wherein:
- the plurality of discrete insulators includes a plurality of first insulators connected to a plurality of second insulators in an alternating manner in the circumferential direction;
- the first insulators each have an outer wall that is longer in the circumferential direction than an inner wall in the circumferential direction;
- the second insulators each have an outer wall that is shorter in the circumferential direction than an inner wall in the circumferential direction; and
- each of the first and second insulators has a tube part that surrounds the respective projection and connects the outer wall with the inner wall.

18. The electric power tool according to claim 16, wherein:
- an engaging groove is defined on a radially-inward end of each of the projections and extends in an axial direction of the stator core; and
- engaging protrusions are defined on a radially outer surface of the inner ring and respectively engage with the engaging grooves.

19. The electric power tool according to claim 18, further comprising a ring-shaped latching member disposed in a latching groove that extends circumferentially in the plurality of discrete insulators, the ring-shaped latching member fixing the inner ring on the outer ring.

20. The electric power tool according to claim 19, wherein:
- the plurality of discrete insulators includes a plurality of first insulators connected to a plurality of second insulators in an alternating manner in the circumferential direction;
- the first insulators each have an outer wall that is longer in the circumferential direction than an inner wall in the circumferential direction;
- the second insulators each have an outer wall that is shorter in the circumferential direction than an inner wall in the circumferential direction; and
- each of the first and second insulators has a tube part that surrounds the respective projection and connects the outer wall with the inner wall.

* * * * *